(12) United States Patent
Kakuko et al.

(10) Patent No.: US 11,055,853 B2
(45) Date of Patent: Jul. 6, 2021

(54) MOTION DETERMINING APPARATUS, METHOD FOR MOTION DETERMINATION, AND NON-TRANSITORY COMPUTER-READABLE STORAGE MEDIUM FOR STORING PROGRAM

(71) Applicant: FUJITSU LIMITED, Kawasaki (JP)

(72) Inventors: Norihiro Kakuko, Kawasaki (JP); Shanshan Yu, Kawasaki (JP); Takeshi Otani, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 203 days.

(21) Appl. No.: 16/364,339

(22) Filed: Mar. 26, 2019

(65) Prior Publication Data

US 2019/0325583 A1 Oct. 24, 2019

(30) Foreign Application Priority Data

Apr. 18, 2018 (JP) .............................. JP2018-080054

(51) Int. Cl.
*G06T 7/20* (2017.01)
*G06T 7/70* (2017.01)
*G06F 3/01* (2006.01)

(52) U.S. Cl.
CPC ................ *G06T 7/20* (2013.01); *G06F 3/012* (2013.01); *G06F 3/017* (2013.01); *G06T 7/70* (2017.01); *G06T 2207/30241* (2013.01)

(58) Field of Classification Search
None
See application file for complete search history.

(56) References Cited

U.S. PATENT DOCUMENTS

| 2005/0271252 | A1 | 12/2005 | Yamada | |
| 2007/0159309 | A1* | 7/2007 | Ito | G16H 10/20 340/425.5 |
| 2013/0163825 | A1* | 6/2013 | Shimura | G06K 9/00335 382/107 |
| 2014/0003664 | A1 | 1/2014 | Umezaki et al. | |

FOREIGN PATENT DOCUMENTS

| JP | 2005-228274 | 8/2005 |
| JP | 2005-352531 | 12/2005 |
| JP | 2007-097668 | 4/2007 |
| JP | 2012-181646 | 9/2012 |

* cited by examiner

*Primary Examiner* — David Perlman
(74) *Attorney, Agent, or Firm* — Fujitsu Patent Center

(57) ABSTRACT

An apparatus for motion determination includes: a memory; and a processor coupled to the memory, the processor being configured to (a) execute a specifying process that includes specifying an orientation of a head portion of a subject, (b) execute a calculation process that includes calculating a trajectory of a position of the head portion of the subject in a vertical direction and a trajectory of the position of the head portion of the subject in a transverse direction in a predetermined time range, and (c) execute a determination process that includes when the calculated trajectory in the vertical direction and the calculated trajectory in the transverse direction satisfy a determination condition for the specified orientation of the head portion, determining that there is a predetermined motion mapped to a motion of the head portion of the subject in the vertical direction.

15 Claims, 22 Drawing Sheets

FIG. 4

| ORIENTATION OF HEAD PORTION (IMAGE AND ROTATION ANGLE) | COORDINATE (COORDINATE Z) IN VERTICAL DIRECTION | | COORDINATE (COORDINATE Y) IN TRANSVERSE DIRECTION | |
|---|---|---|---|---|
| | TRAJECTORY OF NODDING MOTION | UPPER LIMIT VALUE AND LOWER LIMIT VALUE | TRAJECTORY OF NODDING MOTION | UPPER LIMIT VALUE AND LOWER LIMIT VALUE |
| $\theta_x = 0°$, $\theta_y = 0°$, $\theta_z = 0°$ | (coordinate in vertical direction vs time) | UPPER LIMIT $z_{u1}$ AND LOWER LIMIT $z_{l1}$ | (coordinate in transverse direction vs time) | UPPER LIMIT $y_{u1}$ AND LOWER LIMIT $y_{l1}$ |
| $\theta_x = 0°$, $\theta_y = 0°$, $\theta_z = 45°$ | (coordinate in vertical direction vs time) | UPPER LIMIT $z_{u2}$ AND LOWER LIMIT $z_{l2}$ | (coordinate in transverse direction vs time) | UPPER LIMIT $y_{u2}$ AND LOWER LIMIT $y_{l2}$ |
| $\theta_x = 0°$, $\theta_y = 0°$, $\theta_z = 90°$ | (coordinate in vertical direction vs time) | UPPER LIMIT $z_{u3}$ AND LOWER LIMIT $z_{l3}$ | (coordinate in transverse direction vs time) | UPPER LIMIT $y_{u3}$ AND LOWER LIMIT $y_{l3}$ |

400

FIG. 10B
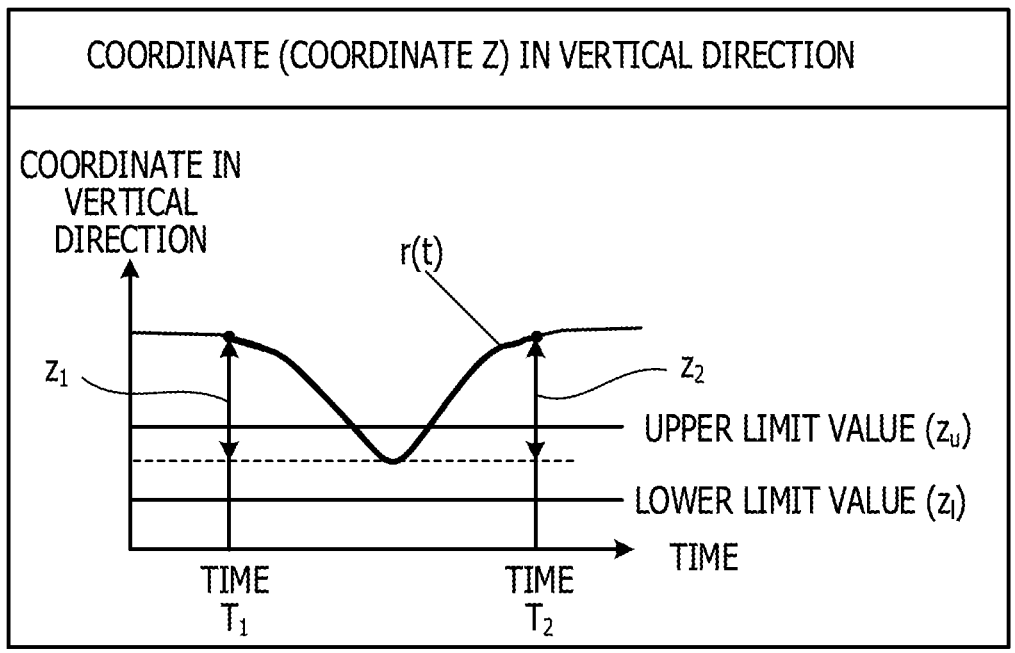
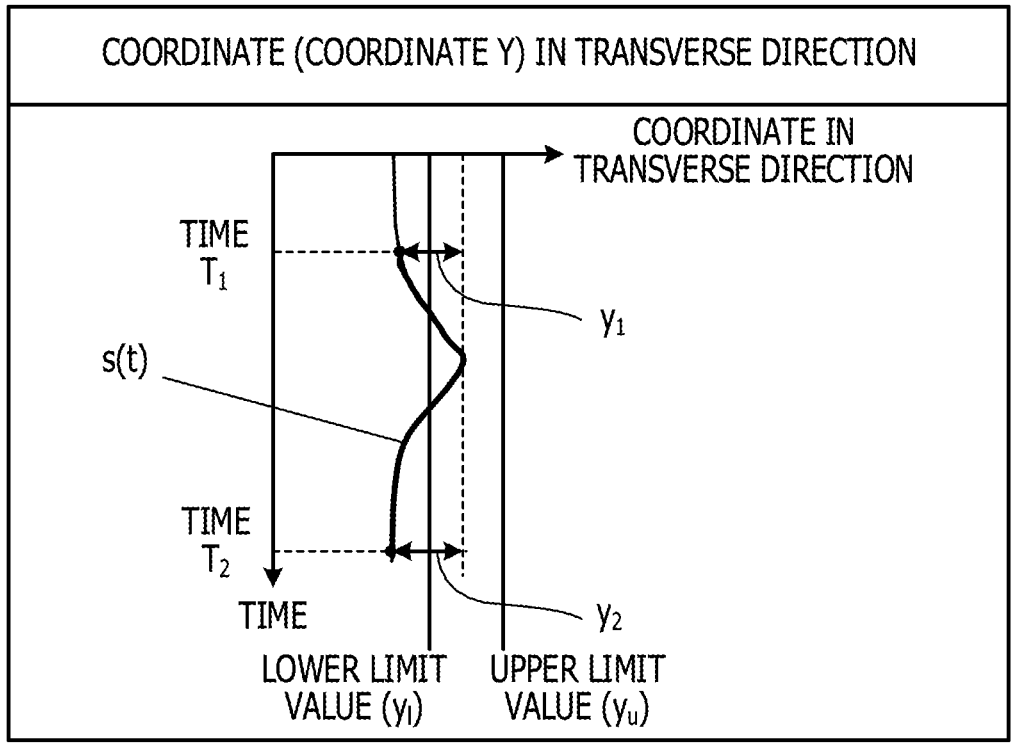

FIG. 13B
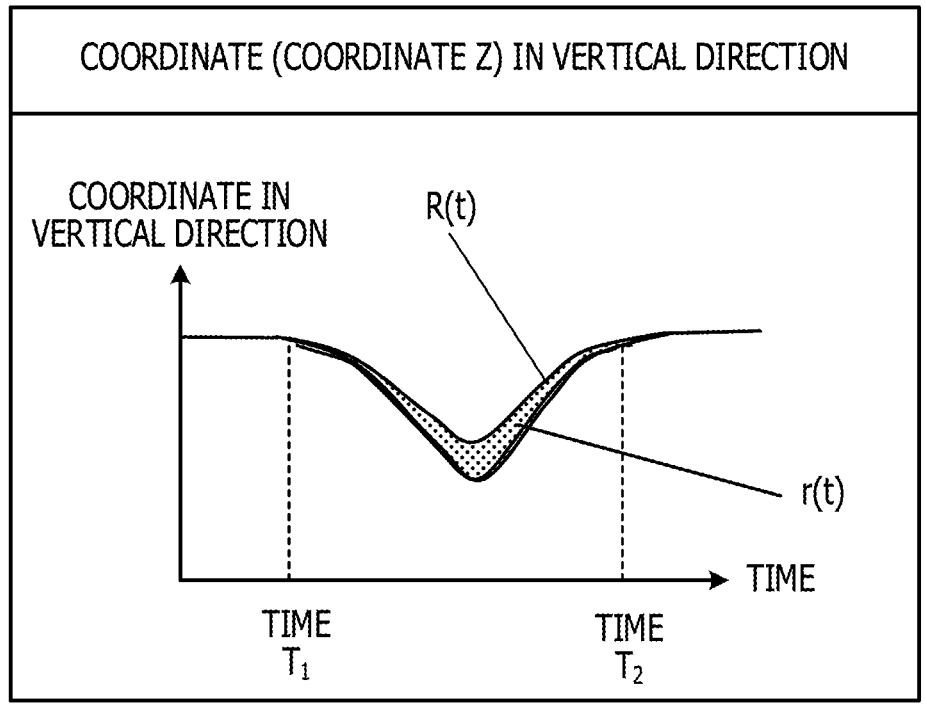
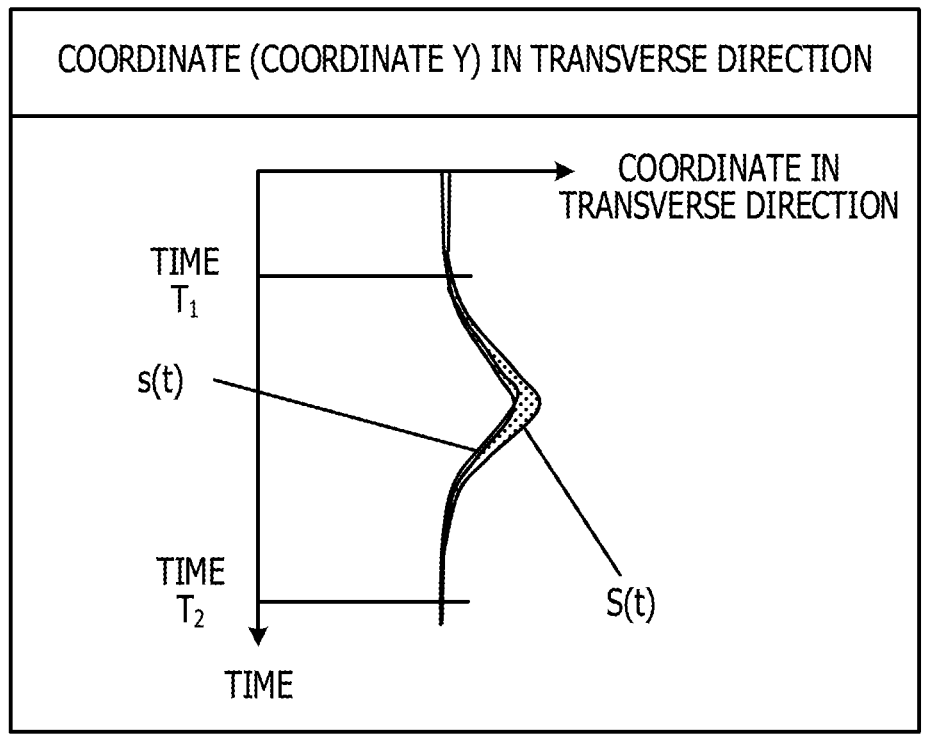

MOTION DETERMINING APPARATUS, METHOD FOR MOTION DETERMINATION, AND NON-TRANSITORY COMPUTER-READABLE STORAGE MEDIUM FOR STORING PROGRAM

CROSS-REFERENCE TO RELATED APPLICATION

This application is based upon and claims the benefit of priority of the prior Japanese Patent Application No. 2018-80054, filed on Apr. 18, 2018, the entire contents of which are incorporated herein by reference.

FIELD

The embodiments discussed herein are related to a motion determining apparatus, method for motion determination, and a non-transitory computer-readable storage medium for storing a program.

BACKGROUND

From the past, a determination technology has been known which determines whether or not there is a predetermined motion (for example, a nodding motion) mapped to a vertical movement of a head portion of a subject, based on captured image data. For example, a method of determining whether or not there is a nodding motion of a subject by calculating the amount of a vertical movement of a head portion of a subject based on captured image data is disclosed in Japanese Laid-open Patent Publication No. 2007-097668.

Examples of the related art include Japanese Laid-open Patent Publication No. 2007-097668.

SUMMARY

According to an aspect of the embodiments, an apparatus for motion determination includes: a memory; and a processor coupled to the memory, the processor being configured to (a) execute a specifying process that includes specifying an orientation of a head portion of a subject, (b) execute a calculation process that includes calculating a trajectory of a position of the head portion of the subject in a vertical direction and a trajectory of the position of the head portion of the subject in a transverse direction in a predetermined time range, and (c) execute a determination process that includes when the calculated trajectory in the vertical direction and the calculated trajectory in the transverse direction satisfy a determination condition for the specified orientation of the head portion, determining that there is a predetermined motion mapped to a motion of the head portion of the subject in the vertical direction.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating a specific example of trajectory information;

FIGS. 10A and 10B are first diagrams illustrating details of a determination process;

FIGS. 13A and 13B are second diagrams illustrating details of a determination process;

DESCRIPTION OF EMBODIMENTS

Figure 1:
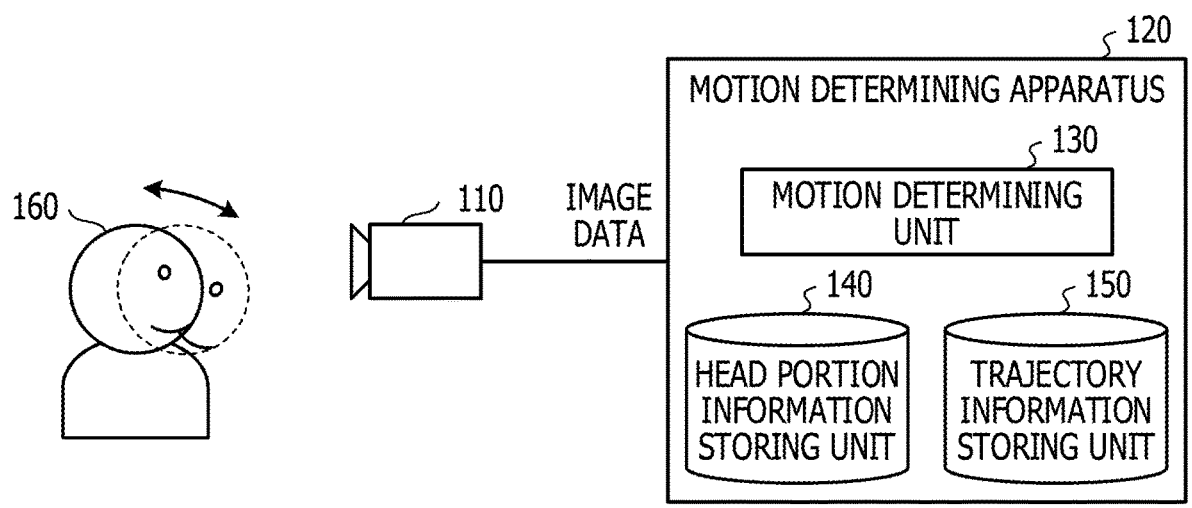
FIG. 1 is a diagram illustrating an example of a system configuration of a nodding motion determining system.

However, in the case of a method of determining whether or not there is a nodding motion based on the amount of a vertical movement of a head portion, for example, a motion other than the nodding motion, such as a motion of twisting a neck of a subject, may be erroneously determined as the nodding motion.

Another aspect is to improve determination accuracy of a predetermined motion mapped to a movement of a head portion in a vertical direction.

Hereinafter, embodiments will be described with reference to the accompanying drawings. In the present specification and the drawings, a component having substantially the same functional configuration is designated by the same reference numeral, and duplicate description will be omitted.

First Embodiment

[System Configuration of Nodding Motion Determining System]

First, a system configuration of a nodding motion system for determining a "nodding motion", which is an example of a predetermined motion mapped to a movement of a head portion of a subject in a vertical direction, will be described. FIG. 1 is a diagram illustrating an example of a system configuration of a nodding motion determining system. As illustrated in FIG. 1, a nodding motion determining system 100 includes an imaging device 110 and a motion determining apparatus 120, both of which are communicably connected to each other.

The imaging device 110 captures a subject 160, and transmits the captured image data to the motion determining apparatus 120.

A motion determining program is installed in the motion determining apparatus 120, and as the motion determining program is executed, the motion determining apparatus 120 functions as a motion determining unit 130.

The motion determining unit 130 calculates the position of a head portion of the subject 160 based on the image data, and calculates a trajectory of the position of the head portion of the subject 160 in a predetermined time range separately in a vertical direction and a transverse direction.

Further, when calculating the trajectory of the position of the head portion of the subject 160 in the vertical direction and the transverse direction, the motion determining unit 130 specifies an orientation of the head portion of the subject 160 based on head portion information (information used when the orientation of the head portion is specified) stored in a head portion information storing unit 140.

Further, the motion determining unit 130 reads determination information (information used when whether or not there is a nodding motion is determined) of the vertical direction and the transverse direction with respect to the orientation of the head portion of the specified subject 160, using a trajectory information storing unit 150. Further, the motion determining unit 130 determines whether or not there is a nodding operation of the subject 160 by comparing the read determination information of the vertical direction and the transverse direction with the calculated trajectory of the position of the head portion of the subject 160 in the vertical direction and the transverse direction.

In this way, in determining whether or not there is the nodding motion of the subject 160, the motion determining unit 130 uses the trajectory of the position of the head portion of the subject 160 in the vertical direction and the transverse direction. Further, the motion determining unit 130 switches the determination information depending on the orientation of the head portion of the subject 160.

Accordingly, according to the motion determining unit 130, it is possible to clearly distinguish a motion of twisting a neck of the subject from a nodding motion of the subject, of which the orientation of the head portion is different. It is possible to reduce a possibility that a motion other than the nodding motion is erroneously determined as the nodding motion. As a result, as compared to a method of determining whether or not there is the nodding motion based on the amount of the vertical movement of the head portion of the subject, determination accuracy of the nodding motion may be improved.

[Hardware Configuration of Motion Determining Apparatus]

Figure 2:
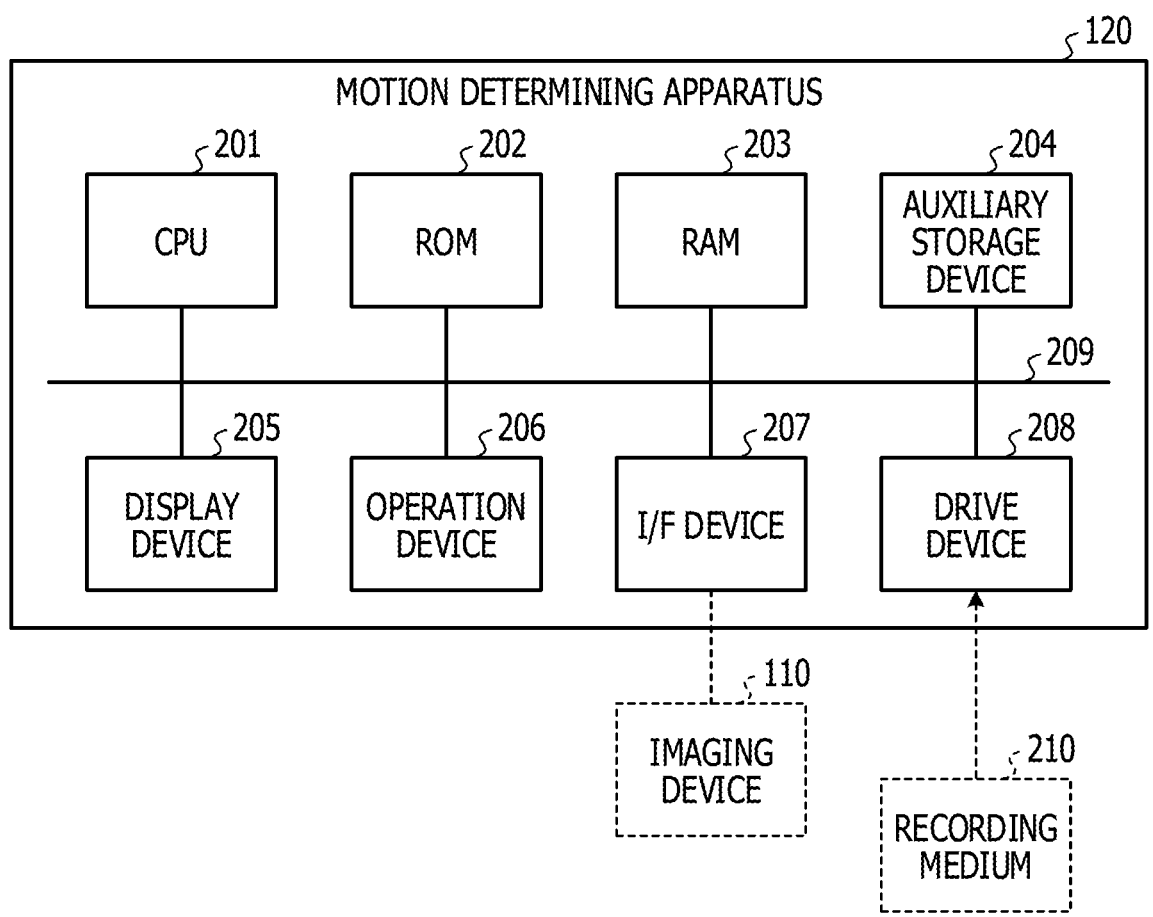
FIG. 2 is a block diagram illustrating an example of a hardware configuration of a motion determining apparatus.

Next, a hardware configuration of the motion determining apparatus 120 will be described. FIG. 2 is a block diagram illustrating an example of a hardware configuration of a motion determining apparatus. As illustrated in FIG. 2, the motion determining apparatus 120 includes a central processing unit (CPU) 201, a read-only memory (ROM) 202, and a random access memory (RAM) 203. The CPU 201, the ROM 202, and the RAM 203 constitute a so-called computer.

Further, the motion determining apparatus 120 includes an auxiliary storage device 204, a display device 205, an operation device 206, an interface (I/F) device 207, and a drive device 208. Hardware configurations of the motion determining apparatus 120 are connected to each other through a bus 209.

The CPU 201 is an arithmetic device that executes various kinds of programs (for example, a motion determining program, and the like) installed in the auxiliary storage device 204.

The ROM 202 is a nonvolatile memory. The ROM 202 functions as a main storage device for storing various programs, data, and the like desired for the CPU 201 to execute various programs installed in the auxiliary storage device 204. In detail, the ROM 202 functions as a main storage device for storing a boot program such as a basic input/output system (BIOS) and an extensible firmware interface (EFI).

The RAM 203 is a volatile memory such as a dynamic random access memory (DRAM) and a static random access memory (SDRAM). The RAM 203 functions as a main storage device that provides a work area to be expanded when various programs installed in the auxiliary storage device 204 are executed by the CPU 201.

The auxiliary storage device 204 is an auxiliary storage device that stores various programs and information used when the various programs are executed. For example, the head portion information storing unit 140 and the trajectory information storing unit 150 are realized in the auxiliary storage device 204.

The display device 205 is a display device that displays an internal state of the motion determining apparatus 120. The operation device 206 is an input device for an administrator of the motion determining apparatus 120 to input various instructions to the motion determining apparatus 120.

The I/F device 207 is a connection device that is connected to the imaging device 110 and transmits and receives the image data between the imaging device 110 and the motion determining apparatus 120.

The drive device 208 is a device for setting a recording medium 210. The recording medium 210 mentioned here includes a medium that optically, electrically, or magnetically records information, such as a CD-ROM, a flexible disc, and a magneto-optical disc. Further, the recording medium 210 may include a semiconductor memory that electrically records information, such as a ROM and a flash memory.

The various programs installed in the auxiliary storage device 204 are installed, for example, by setting the distributed recording medium 210 in the drive device 208 and reading out various programs recorded in the recording medium 210 by the drive device 208. Alternatively, the various programs installed in the auxiliary storage device 204 may be installed by being downward from a network.

[Specific Example of Head Portion Information]

Figures 3A, 3B:
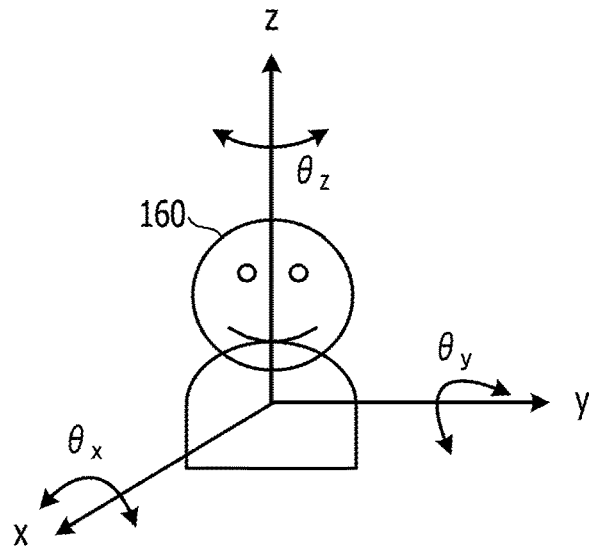
FIGS. 3A and 3B are diagrams illustrating a specific example of head portion information.

Next, a detailed example of the head portion information stored in the head portion information storing unit 140 will be described. FIGS. 3A and 3B are diagrams illustrating a specific example of the head portion information. Among them, FIG. 3A illustrates coordinates for defining the orientation of the head portion of the subject in head portion information 310.

As illustrated in FIG. 3A, in the first embodiment, in a state in which the subject 160 faces the front side with respect to an imaging direction of the imaging device 110, a forward direction of the subject 160 is defined as an x-axis direction. Further, in a state in which the subject 160 faces the front side with respect to the imaging direction of the imaging device 110, a left hand direction of the subject 160 is defined as a y-axis direction, and an upward direction of the subject 160 is defined as a z-axis direction.

Further, in the first embodiment, a rotation angle about an x axis of the head portion of the subject 160 is defined as $\theta_x$, a rotation angle about a y axis is defined as $\theta_y$, and a rotation angle about a z axis is defined as $\theta_z$.

FIG. 3B illustrates a detailed example of the head portion information 310 stored in the head portion information storing unit 140. As illustrated in FIG. 3B, the head portion information 310 includes a "orientation of head portion (image)" and a "orientation of head portion (rotation angle)" as an item of information.

Images having different directions of head portions are stored in the "orientation of the head portion (image)". In the "orientation of the head portion (image)", an image having a different orientation of the head portion of the subject 160 himself/herself may be stored or an image having a different orientation of the head portion of a subject other than the subject 160 may be stored.

In the "orientation of the head portion (a rotation angle)", in the image stored in the "orientation of the head portion (an image)", the rotation angle $\theta_x$ about the x axis of the head portion of the subject, the rotation angle $\theta_y$ about the y axis of the head portion of the subject, and the rotation angle $\theta_z$ about the z axis of the head portion of the subject are stored.

An example of FIG. 3B illustrates a state in which an orientation of a head portion of a subject of an image 311 is $\theta_x=0°$, $\theta_y=0°$, and $\theta_z=0°$. Further, an example of FIG. 3B illustrates a state in which an orientation of a head portion of a subject of an image 312 is $\theta_x=0°$, $\theta_y=0°$, and $\theta_z=45°$. Furthermore, an example of FIG. 3B illustrates a state in which an orientation of a head portion of a subject of an image 313 is $\theta_x=0°$, $\theta_y=0°$, and $\theta_z=90°$.

Although the examples of FIG. 3B illustrate three kinds of directions as types of the orientation of the head portion (the rotation angle) of the subject, the types of the orientation of the head portion (the rotation angle) of the subject are not limited to three.

[Detailed Example of Trajectory Information]

Next, a detailed example of the trajectory information stored in the trajectory information storing unit 150 will be described. FIG. 4 is a diagram illustrating a detailed example of trajectory information. As illustrated in FIG. 4, the trajectory information 400 includes a "coordinate of vertical direction (coordinate z)" and a "coordinate of transverse direction (coordinate y)" as an item of information.

Each of the "coordinate (coordinate z) of vertical direction" and the "coordinate (coordinate y) of transverse direction" includes a "trajectory of nodding motion" and an "upper limit value and lower limit value".

A trajectory (a time change of a coordinate z indicating the position of the head portion) of the position of the head portion of the subject in the vertical direction when the subject performs the nodding motion within a predetermined time range is stored in the "trajectory of nodding motion" of the "coordinate (coordinate z) of vertical direction". In the "trajectory of nodding motion", a trajectory of the nodding motion of the subject 160 himself/herself in the past may be stored or a trajectory of the nodding motion of a subject other than the subject 160 in the past may be stored.

The trajectory of the position of the head portion of the subject in the vertical direction is stored in the "trajectory of nodding motion" of the "coordinate (coordinate z) of vertical direction" separately for each "direction (image and rotation angle) of head portion". An example of FIG. 4 illustrates that the trajectory of the position of the head portion of the subject in the vertical direction is stored separately when the orientation of the head portion is $\theta_x=0°$, $\theta_y=0°$, and $\theta_z=0°$, when the orientation of the head portion is $\theta_x=0°$, $\theta_y=0°$, and $\theta_z=45°$, and when the orientation of the head portion is $\theta_x=0°$, $\theta_y=0°$, and $\theta_z=90°$.

An upper limit value and a lower limit value of a minimum value of the trajectory of the position of the head portion of the subject in the vertical direction, stored in the corresponding "trajectory of nodding motion", are stored in the "upper limit value and lower limit value" of the "coordinate (coordinate z) of vertical direction".

The upper limit value and the lower limit value of the minimum value are calculated by statistically processing minimum values of a plurality of trajectories stored in the "trajectory of nodding motion". The upper limit value and the lower limit value are stored separately for each "orientation (image and rotation angle) of head portion", and are determined for each "orientation (image and rotation angle) of head portion" based on a plurality of trajectories of positions of head portions of subjects in a vertical direction. An example of FIG. 4 illustrates that when the orientation of the head portion is $\theta_x=0°$, $\theta_y=0°$, and $\theta_z=0°$, the upper limit value=$z_{u1}$ and the lower limit value=$z_{l1}$, when the orientation of the head portion is $\theta_x=0°$, $\theta_y=0°$, and $\theta_z=45°$, the upper limit value=$z_{u2}$ and the lower limit value=$z_{l2}$, and when the orientation of the head portion is $\theta_x=0°$, $\theta_y=0°$, and $\theta_z=90°$, the upper limit value=$z_{u3}$ and the lower limit value=$z_{l3}$. In FIG. 4, due to space limitations, a state is illustrated in which one trajectory of a position of a head portion of a subject in a vertical direction is stored in each "direction (image and rotation angle) of head portion". Actually, a plurality of trajectories are stored.

Similarly, a trajectory (a time change of a coordinate y indicating the position of the head portion) of the position of the head portion of the subject in the transverse direction when the subject performs the nodding motion within a predetermined time range is stored in the "trajectory of nodding motion" of the "coordinate (coordinate y) of transverse direction". Similar to the case of the "coordinate (coordinate z) of vertical direction", the trajectory of the position of the head portion of the subject in the transverse direction is stored in the "trajectory of nodding motion" of the "coordinate (coordinate y) of transverse direction" separately for each "direction (image and rotation angle) of head portion".

Further, the upper limit value and the lower limit value of the minimum value of the trajectory of the position of the head portion of the subject in the transverse direction, stored in the corresponding "trajectory of nodding motion", are stored in the "upper limit value and lower limit value" of the "coordinate (coordinate y) of transverse direction". The upper limit value and the lower limit value are determined for each "direction (image and rotation angle) of head portion" based on the plurality of trajectories of the position of the head portion of the subjects in a transverse direction. An example of FIG. 4 illustrates that when the orientation of the head portion is $\theta_x=0°$, $\theta_y=0°$, and $\theta_z=0°$, the upper limit value=$y_{u1}$ and the lower limit value=$y_{l1}$, when the orientation of the head portion is $\theta_x=0°$, $\theta_y=0°$, and $\theta_z=45°$, the upper limit value=$y_{u2}$ and the lower limit value=$y_{l2}$, and when the orientation of the head portion is $\theta_x=0°$, $\theta_y=0°$, and $\theta_z=90°$, the upper limit value=$y_{u3}$ and the lower limit value=$y_{l3}$.

[Functional Configuration of Motion Determining Apparatus]

Figure 5:
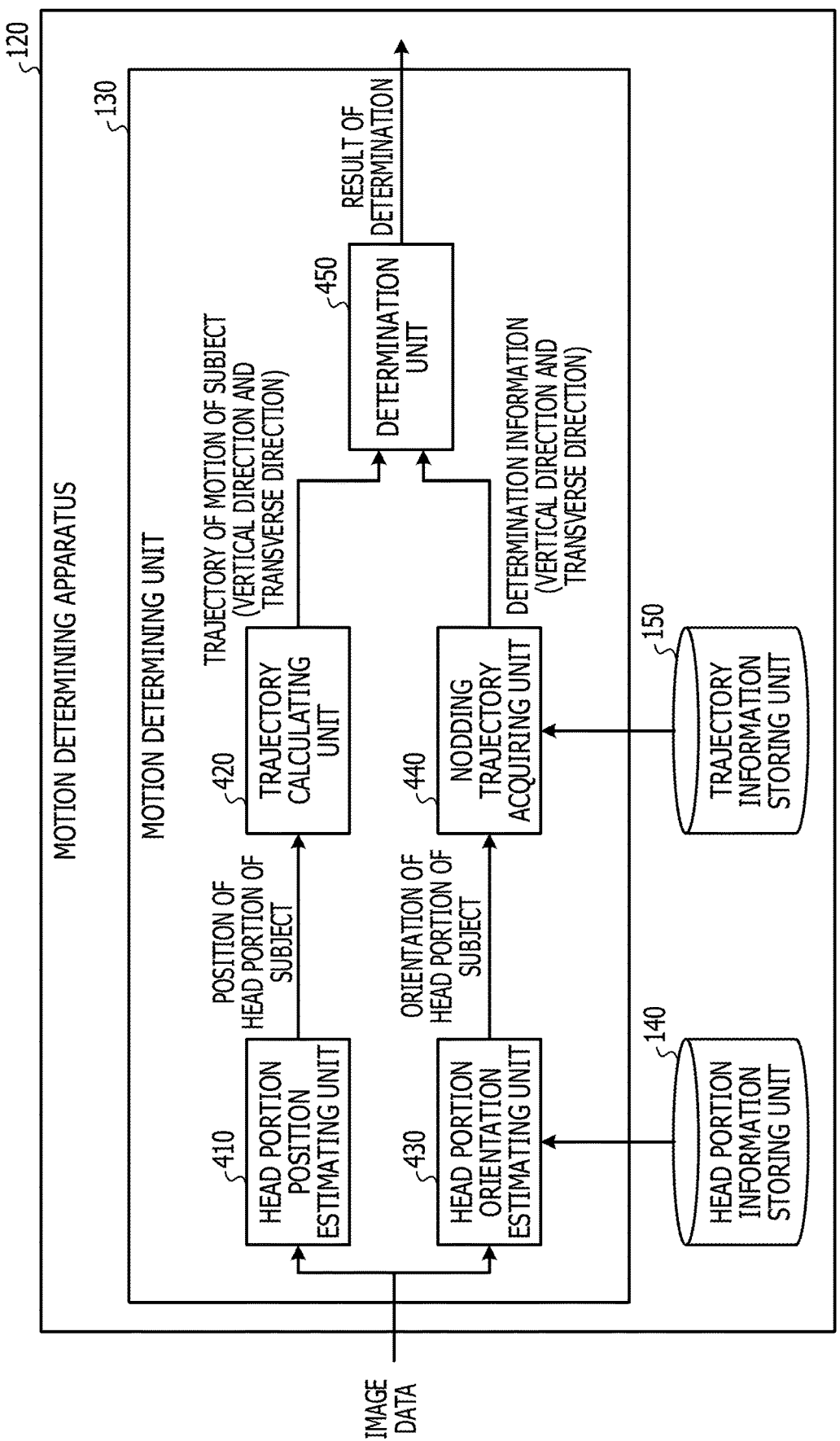
FIG. 5 is a diagram illustrating an example of a functional configuration of the motion determining apparatus.

Next, a functional configuration of the motion determining unit 130 of the motion determining apparatus 120 will be described. FIG. 5 is a diagram illustrating an example of a functional configuration of the motion determining apparatus. As illustrated in FIG. 5, the motion determining unit 130 includes a head portion position estimating unit 410, a trajectory calculating unit 420, a head portion orientation estimating unit 430, a nodding trajectory acquiring unit 440, and a determination unit 450.

The head portion position estimating unit 410 receives image data from the imaging device 110, and calculates the position (the coordinate y and the coordinate z) of the head portion of the subject 160 based on the received image data. Further, the head portion position estimating unit 410 notifies the trajectory calculating unit 420 of the calculated position (the coordinate y and the coordinate z) of the head portion of the subject 160.

The trajectory calculating unit 420 is an example of a calculation unit. The trajectory calculating unit 420 determines whether or not a motion (a vertical direction and a transverse direction) of the subject 160 in a predetermined time range satisfies a predetermined motion condition, based on the position (the coordinate y and the coordinate z) of the head portion of the subject 160, notified from the head portion position estimating unit 410. When it is determined that the motion (the vertical direction and the transverse direction) of the subject 160 in the predetermined time range satisfies the predetermined motion condition, the trajectory calculating unit 420 calculates the trajectory of the position of the head portion of the subject 160 in the predetermined time range in the vertical direction and the transverse direction, and notifies the determination unit 450 of the calculated trajectory.

The head portion orientation estimating unit 430 is an example of a specifying unit. The head portion orientation estimating unit 430 receives the image data from the imaging device 110. Further, when the trajectory of the position of the head portion of the subject 160 in the vertical direction and the transverse direction is notified to the determination unit 450 by the trajectory calculating unit 420, the head portion orientation estimating unit 430 specifies the orientation of the head portion of the subject 160 based on the corresponding image data.

The head portion orientation estimating unit 430 specifies the orientation of the head portion of the subject 160 by calculating a correlation value between the head portion information 310 of the head portion information storing unit 140 and an image (for example, the images 311 to 313) stored in the "direction (image) of head portion". Further, the head portion orientation estimating unit 430 notifies the nodding trajectory acquiring unit 440 of the specified orientation of the head portion of the subject 160.

When the orientation of the head portion of the subject 160 is notified from the head portion orientation estimating unit 430, the nodding trajectory acquiring unit 440 reads out the upper limit values and the lower limit values of the orientation of the head portion of the subject 160 in the vertical direction and the transverse direction, with reference to the trajectory information 400 of the trajectory information storing unit 150.

Further, the nodding trajectory acquiring unit 440 notifies the determination unit 450 of the read-out upper limit values and the read-out lower limit values in the vertical direction and the transverse direction as the determination information (the vertical direction and the transverse direction).

The determination unit 450 compares the trajectories of the position of the head portion of the subject 160 in the vertical direction and the transverse direction in the predetermined time range, which are notified from the trajectory calculating unit 420, with the determination information (the vertical direction and the transverse direction) notified from the nodding trajectory acquiring unit 440.

As a result of the comparison, when both the trajectories of the position of the head portion of the subject 160 in the vertical direction and the transverse direction in the predetermined time range satisfy the predetermined determination condition, the determination unit 450 determines that there was a nodding motion in the subject 160. In this case, the determination unit 450 outputs a result of the determination indicating that there was the nodding motion in the subject 160.

[Flow of Motion Determining Process by Motion Determining Apparatus]

Figure 6:
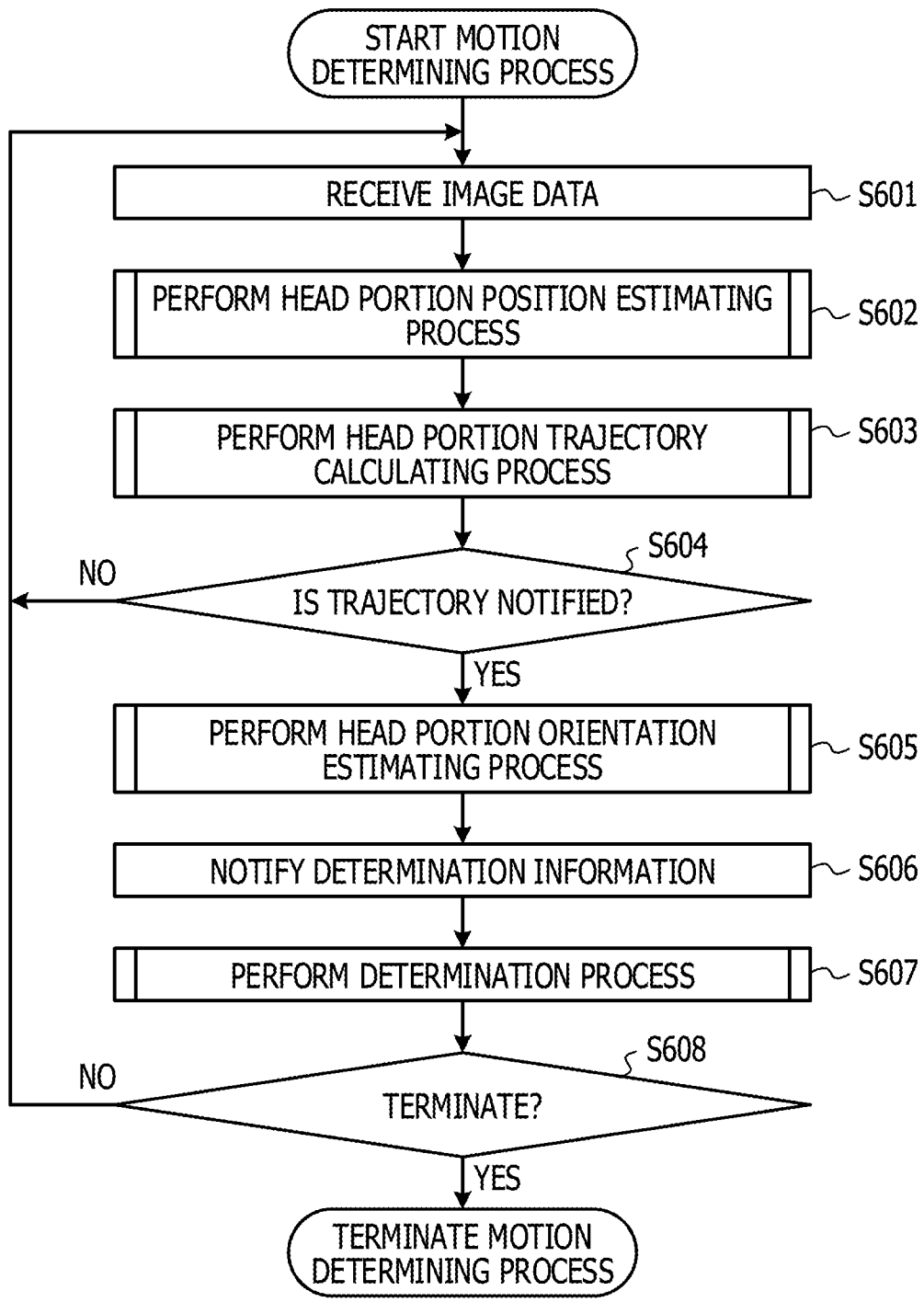
FIG. 6 is a flowchart illustrating flow of a motion determining process by the motion determining apparatus according to a first embodiment.

Next, flow of the motion determining process by the motion determining apparatus 120 will be described. FIG. 6 is a flowchart illustrating flow of a motion determining process by the motion determining apparatus according to a first embodiment. When the imaging device 110 starts to capture the subject 160, the motion determining unit 130 is started, and the motion determining process illustrated in FIG. 6 is executed.

In step S601, the head portion position estimating unit 410 receives the image data transmitted from the imaging device 110. Further, the head portion orientation estimating unit 430 receives the image data transmitted from the imaging device 110.

In step S602, the head portion position estimating unit 410 executes a "head portion position estimating process" of calculating the position of the head portion of the subject 160 based on the received image data. Details of the head portion position estimating process (step S602) will be described below.

In step S603, the trajectory calculating unit 420 executes a "head portion trajectory calculating process" for calculating the trajectories of the position of the head portion of the subject 160 in the vertical direction and the transverse direction in the predetermined time range, based on the position of the head portion of the subject 160. Details of the head portion position calculating process (step S603) will be described below.

In step S604, the head portion orientation estimating unit 430 determines whether or not the trajectories of the position of the head portion of the subject 160 in the vertical direction and the transverse direction in the predetermined time range are notified to the determination unit 450 by the trajectory calculating unit 420. In step S604, when it is determined that the notification is not performed (No in step S604), the process proceeds to step S601.

In step S604, when it is determined that the notification is performed (Yes in step S604), the process proceeds to step S605.

In step S605, the head portion orientation estimating unit 430 executes a "head portion orientation estimating process" of specifying the orientation of the head portion of the subject 160 based on the received image data. Details of the head portion orientation estimating process (step S605) will be described below.

In step S606, the nodding trajectory acquiring unit 440 notifies the determination unit 450 of the upper limit values and the lower limit values for the orientation of the head portion of the subject 160 in the vertical direction and the transverse direction as the determination information (the vertical direction and the transverse direction).

In step S607, the determination unit 450 executes a "determination process" of determining whether or not there is the nodding motion, by comparing the trajectories of the position of the head portion of the subject 160 in the vertical direction and the transverse direction in the predetermined time range with the determination information (the vertical direction and the transverse direction). Details of the determination process (step S607) will be described below.

In step S608, the head portion position estimating unit 410 determines whether or not to terminate the motion determining process. In step S608, when it is determined to continuously perform the motion determining process (No in step S608), the process proceeds to step S601.

Meanwhile, in step S608, when it is determined to terminate the motion determining process (Yes in step S608), the motion determining process is terminated.

[Details of Each Step of Motion Determining Process]

Next, details of each step (steps S602, S603, S605, and S607) of the motion determining process will be described.

(1) Details of Head Portion Position Estimating Process (Step S602)

Figure 7A:
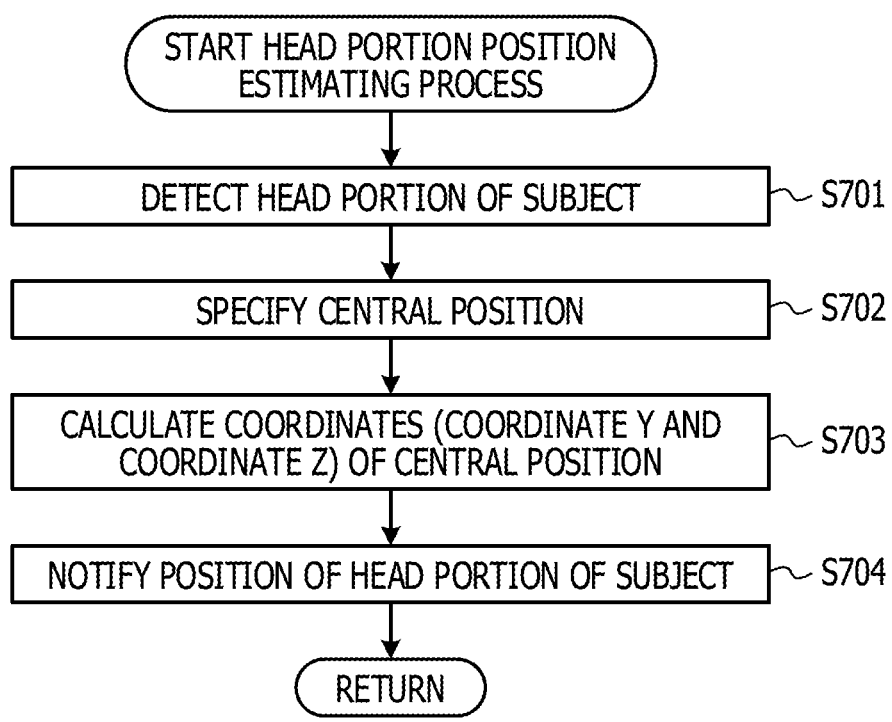
FIGS. 7A and 7B are diagrams illustrating details of a head portion position estimating process.
Figure 7B:
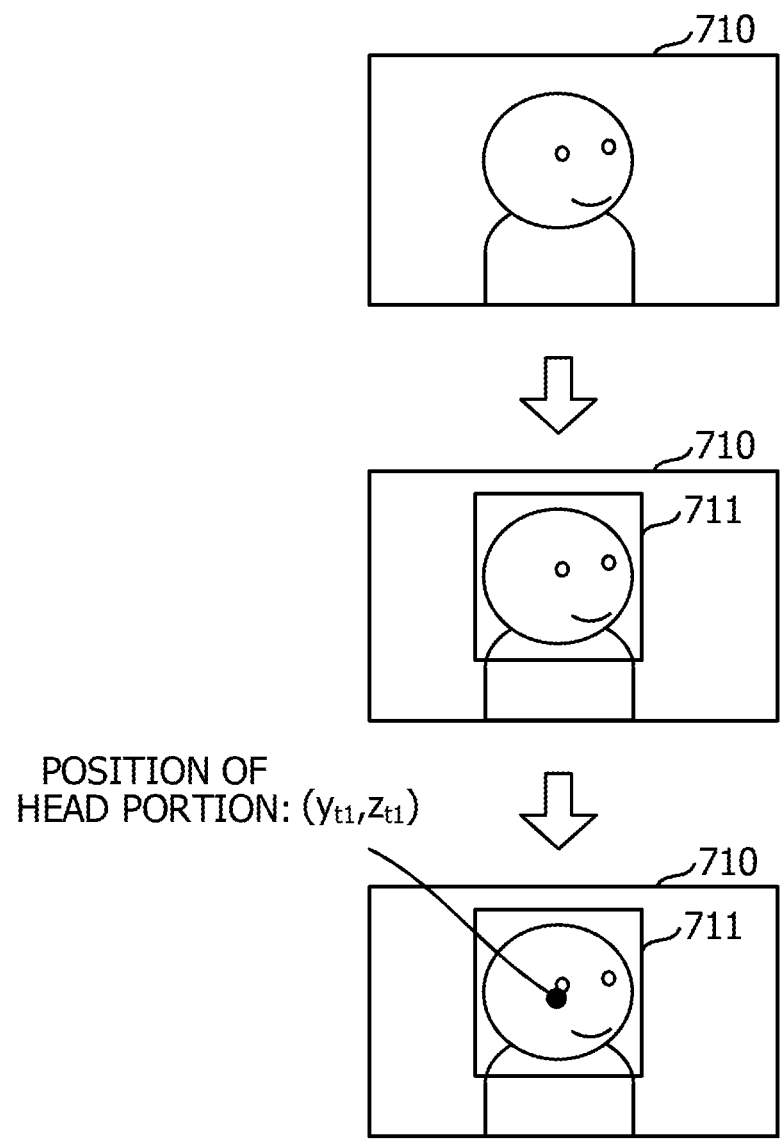

First, details of the head portion position estimating process (step S602) will be described below. FIGS. 7A and 7B are diagrams illustrating details of the head portion position estimating process. That is, FIG. 7A is a flowchart illustrating flow of the head portion position estimating process, and FIG. 7B is a diagram illustrating a detailed example of the head portion position estimating process. Hereinafter, details of the head portion position estimating process will be described along the flowchart of FIG. 7A with reference to FIG. 7B.

In step S701, the head portion position estimating unit 410 detects an area 711 of the head portion of the subject 160 included in image data 710 received at a time $t_1$.

In step S702, the head portion position estimating unit 410 specifies a central position of the detected area 711.

In step S703, the head portion position estimating unit 410 calculates coordinates (coordinate $y=y_u$ and coordinate $z=z_u$) of the specified central position.

In step S704, the head portion position estimating unit 410 notifies the trajectory calculating unit 420 of the coordinates calculated in step S703 as the position (coordinate y and coordinate z) of the head portion of the subject 160 at the time $t_1$.

(2) Details of Head Portion Position Calculating Process (Step S603)

Figure 8A:
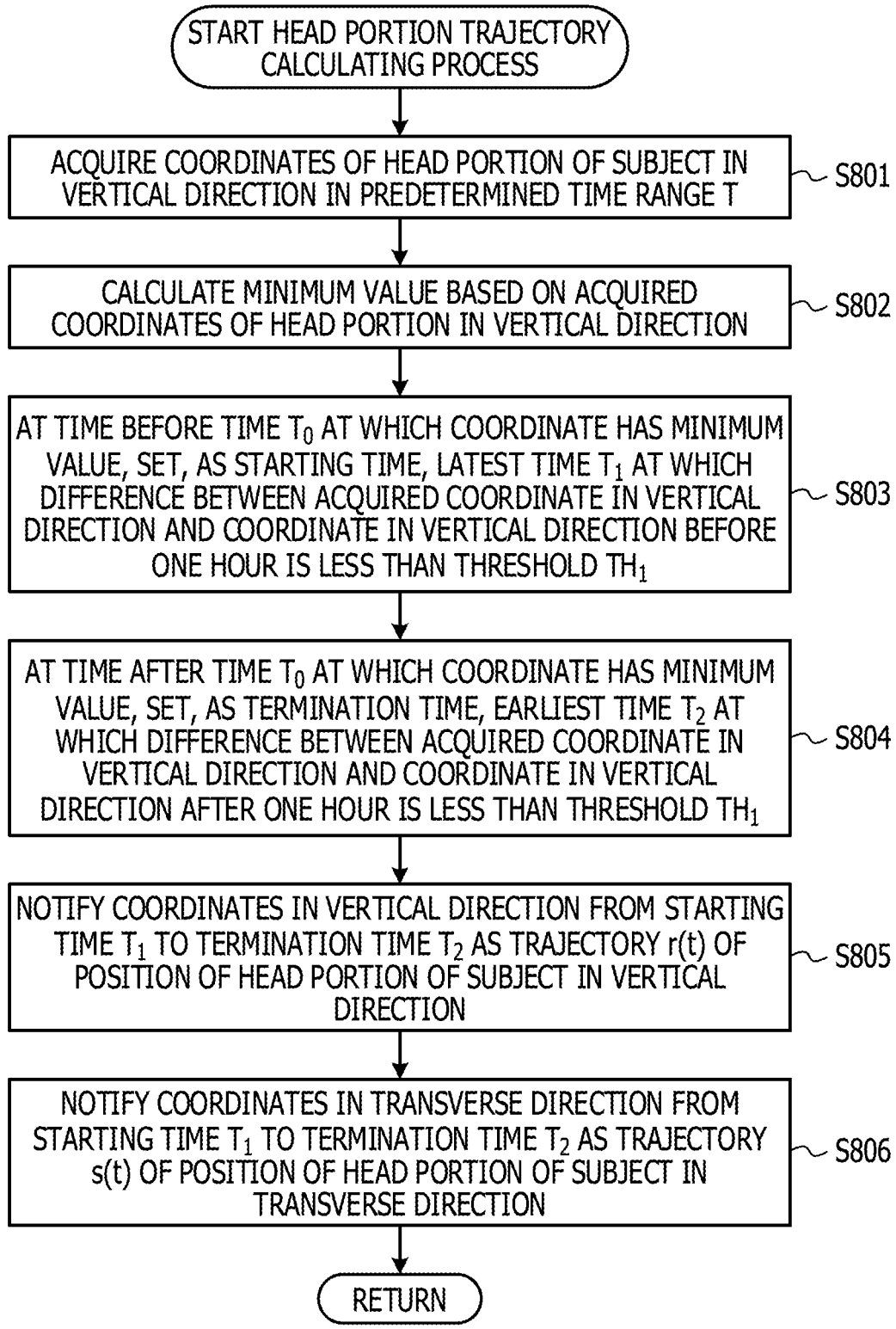
FIGS. 8A and 8B are diagrams illustrating details of a head portion trajectory calculating process.
Figure 8B:
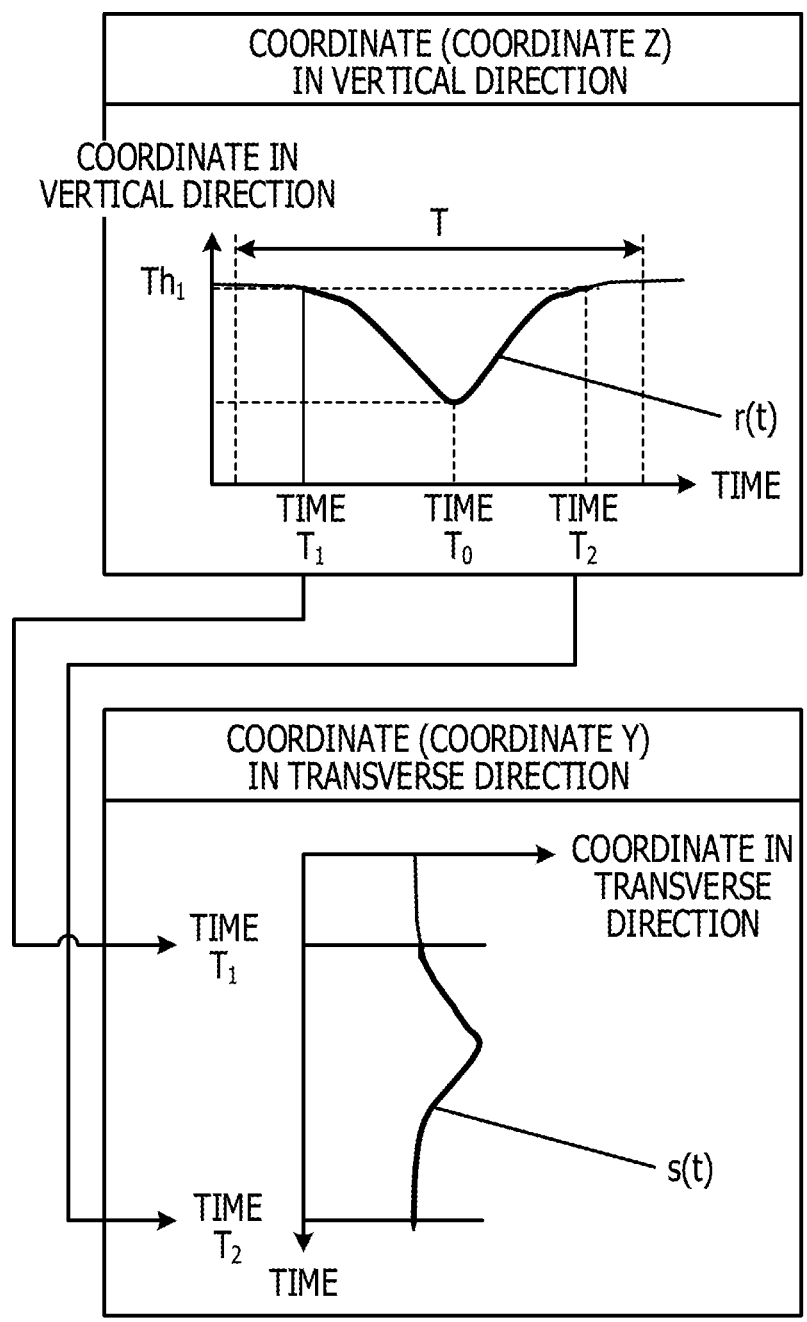

Next, details of the head portion trajectory calculating process (step S603) will be described below. FIGS. 8A and 8B are diagram illustrating details of the head portion trajectory calculating process. That is, FIG. 8A is a flowchart illustrating flow of the head portion trajectory calculating process, and FIG. 8B is a diagram illustrating a detailed example of the head portion trajectory calculating process. Hereinafter, details of the head portion trajectory calculating process will be described along the flowchart of FIG. 8A with reference to FIG. 8B.

In step S801, the trajectory calculating unit 420 acquires a coordinate (a coordinate z) of the head portion of the subject 160 in the vertical direction in the predetermined time range T among the position (the coordinate y and the coordinate z) of the head portion of the subject 160, which is notified from the head portion position estimating unit 410.

In step S802, the trajectory calculating unit 420 calculates a minimum value of the acquired coordinate (the coordinate z) in the vertical direction.

In step S803, at a time before a time $T_0$ at which the coordinate has a minimum value, the trajectory calculating unit 420 detects the latest time $T_1$ at which a difference between the acquired coordinate (the coordinate z) in the vertical direction and a coordinate in the vertical direction before one hour is less than a threshold $Th_1$, and sets the latest time $T_1$ as a starting time.

In step S804, at a time after the time $T_0$ at which the coordinate has a minimum value, the trajectory calculating unit 420 detects the earliest time $T_2$ at which a difference between the acquired coordinate (the coordinate z) in the vertical direction and a coordinate in the vertical direction after one hour is less than the threshold $Th_1$, and sets a termination time.

In step S805, the trajectory calculating unit 420 notifies the determination unit 450 of the coordinate (the coordinate z) from a start time ($=T_1$) to a termination time ($=T_2$) in the vertical direction as a trajectory r(t) of the position of the head portion of the subject 160 in the vertical direction.

In step S806, the trajectory calculating unit 420 notifies the determination unit 450 of the coordinate (the coordinate y) from a start time ($=T_1$) to a termination time ($=T_2$) in the transverse direction as a trajectory s(t) of the position of the head portion of the subject 160 in the transverse direction.

In the trajectory calculating unit 420, in steps S803 and S804, when the start time and the termination time are not set within a predetermined time range T, it is determined that the motion (the vertical direction and the transverse direction) of the subject 160 satisfies the predetermined motion condition in the predetermined time range T. In this case, the trajectory calculating unit 420 does not notify the determination unit 450 of the trajectories of the position of the head portion of the subject 160 in the vertical direction and the transverse direction in the predetermined time range T.

(3) Details of Head Portion Orientation Estimating Process (Step S605)

Figure 9A:
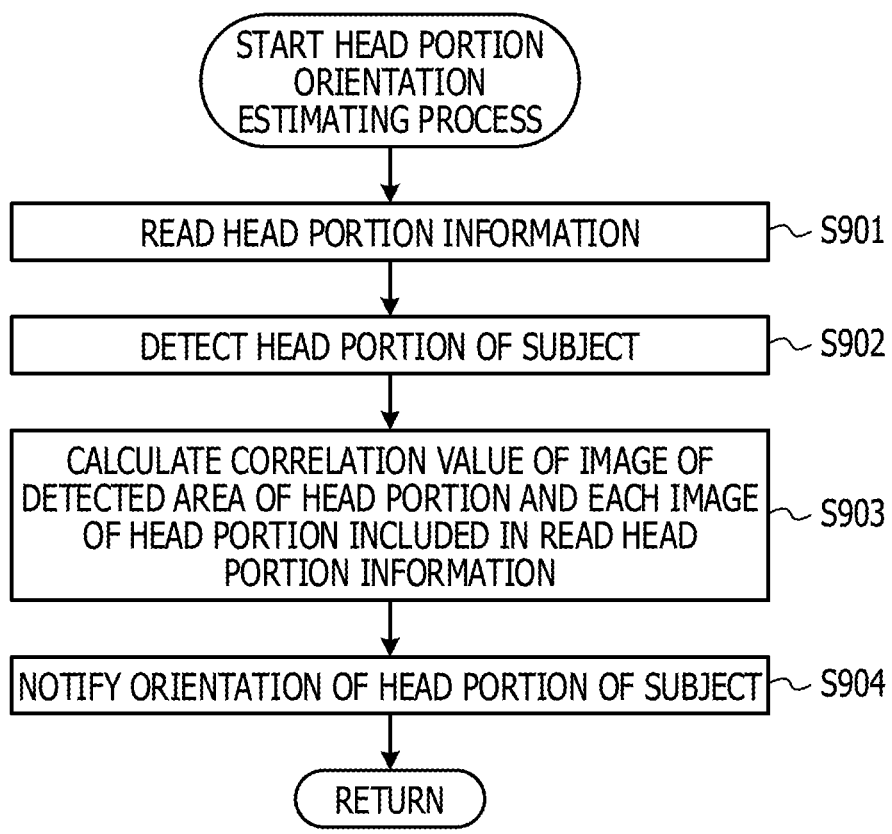
FIGS. 9A and 9B are diagrams illustrating details of a head portion orientation estimating process.
Figure 9B:
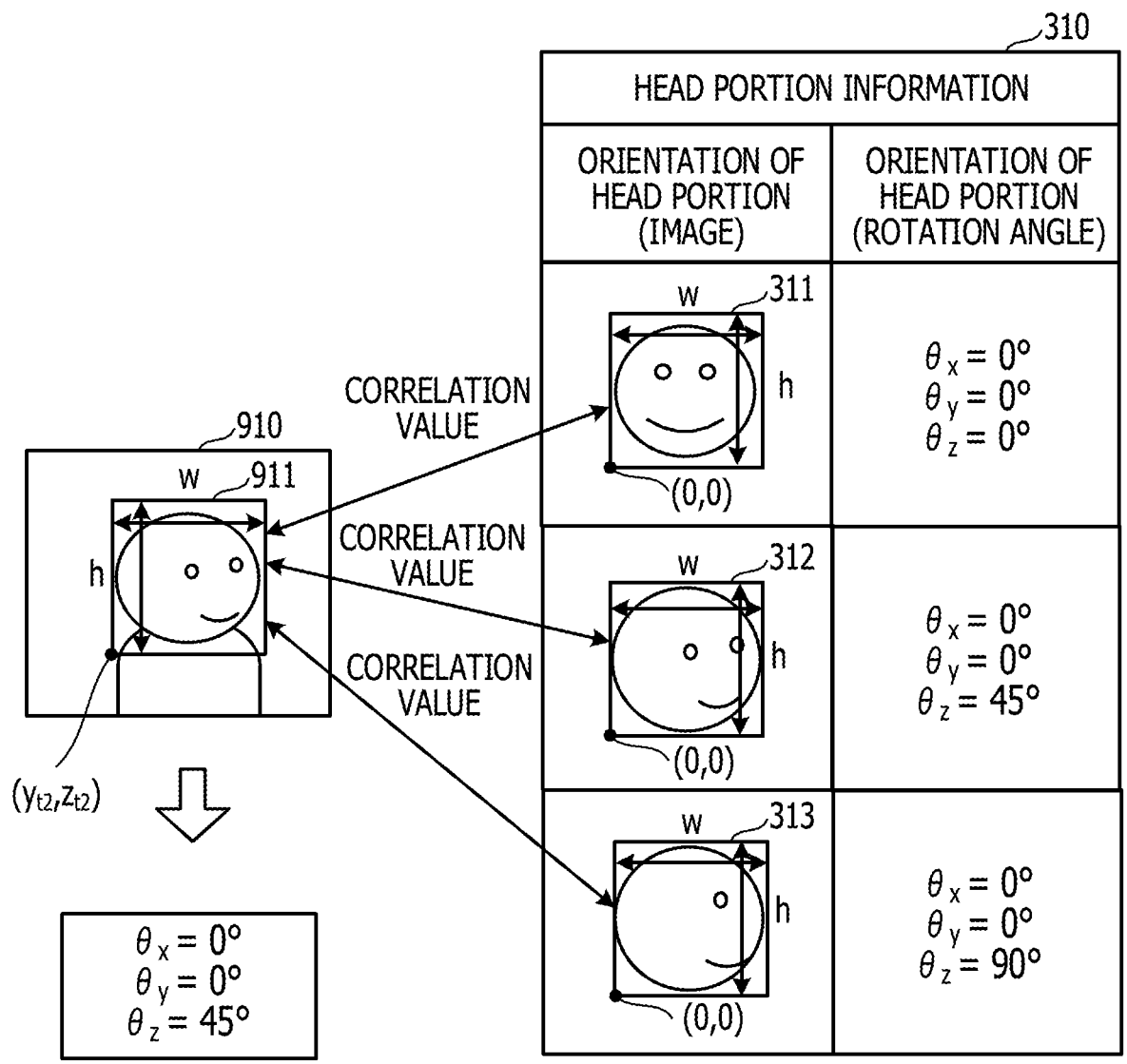

Next, details of the head portion orientation estimating process (step S605) will be described below. FIG. 9A are diagrams illustrating details of the head portion orientation estimating process. That is, FIG. 9A is a flowchart illustrating flow of the head portion orientation estimating process, and FIG. 9B is a diagram illustrating a detailed example of the head portion orientation estimating process. Hereinafter, details of the head portion orientation estimating process will be described along the flowchart of FIG. 9A with reference to FIG. 9B.

In step S901, the head portion orientation estimating unit 430 reads out the head portion information 310 stored in the head portion information storing unit 140.

In step S902, the head portion orientation estimating unit 430 detects an area 911 of the head portion of the subject 160 included in image data 910.

In step S903, the head portion orientation estimating unit 430 calculates a correlation value between an image of the detected area 911 of the head portion and the image (for example, the images 311 to 313) stored in the "direction (image) of head portion" in the read-out head portion information 310.

Here, the head portion orientation estimating unit 430 sets a luminance of each pixel of the image of the area 911 of the head portion detected by the image data 910 at a time $t_2$ as $F(y_{t2}+m, z_{t2}+n)$. However, $y_{t2}$ is a coordinate y of a lower left vertex of the area 911, and $z_{t2}$ is a coordinate z of the lower left vertex of the area 911. Further, m denotes the number of pixels (the number of pixels up to each position in the area 911) up to each position in the y axis direction when viewed from the lower left vertex of the area 911, and takes a value from 0 to w. Further, n denotes the number of pixels (the number of pixels up to each position in the area 911) up to each position in the z axis direction when viewed from the lower left vertex of the area 911, and takes a value from 0 to h.

Further, among the head portion information 310 read out by the head portion orientation estimating unit 430, a luminance of each pixel in the images 311 to 313 in the direction $\theta_z$ of the head portion is set as $G_{\theta_z}(m, n)$.

In this case, the correlation value calculated by the head portion orientation estimating unit 430 can be expressed by Equation (1).

$$\text{Correlation value} = \frac{1}{\sum_{m=0\sim w, n=0\sim h} |F(y_{t2} + m, z_{t2} + n) - G_{\theta_z}(m, n)|} \quad (1)$$

In step S904, the head portion orientation estimating unit 430 specifies a maximum correlation value among the correlation values calculated in step S903. Further, the head portion orientation estimating unit 430 specifies the "direction (rotation angle) of head portion" corresponding to the specified correlation value as the orientation of the head portion of the subject 160, and notifies the nodding trajectory acquiring unit 440 of the specified orientation of the head portion of the subject 160.

An example of FIG. 9B illustrates that a state in which the orientation of the head portion of the subject 160 is $\theta_x=0°$, $\theta_y=0°$, and $\theta_z=45°$ is notified to the nodding trajectory acquiring unit 440.

(4) Details of Determination Process (Step S607)

Figure 10A:
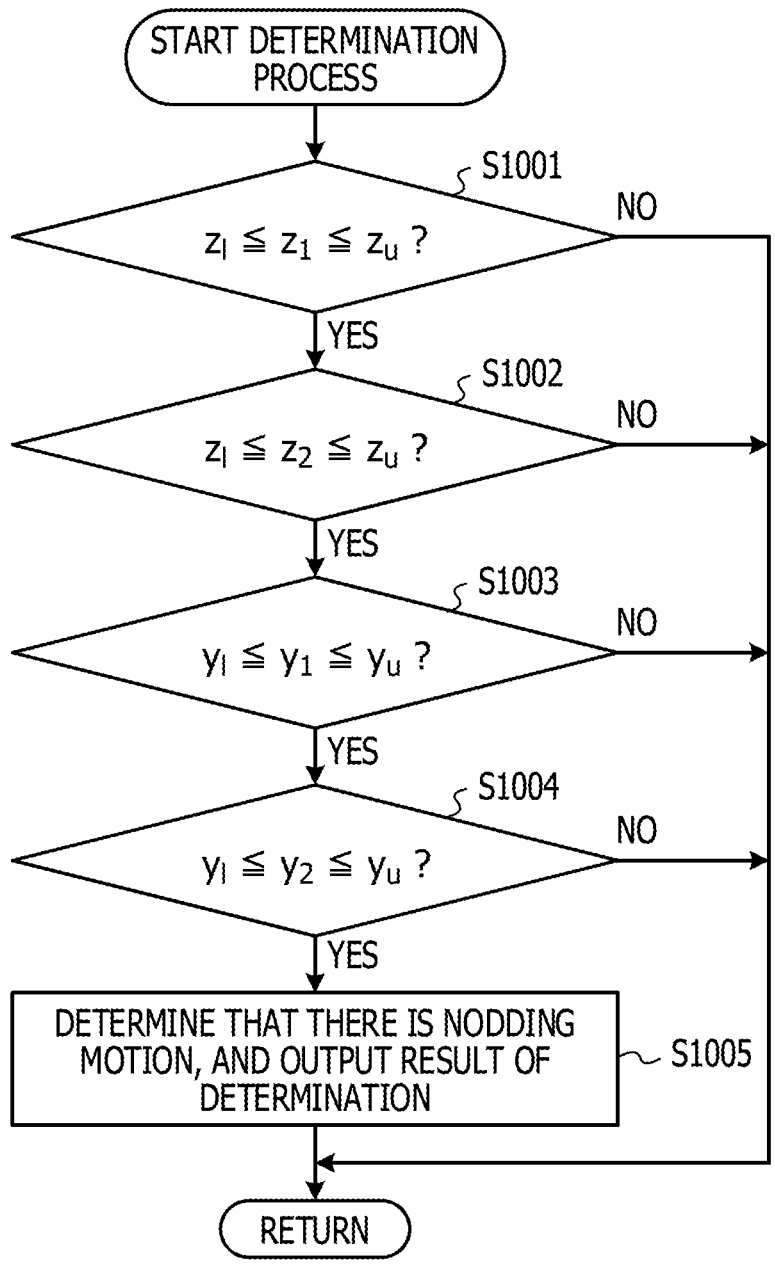

Next, details of the determination process (step S607) will be described below. FIGS. 10A and 10B are diagrams illustrating details of the determination process. Among them, FIG. 10A is a flowchart illustrating flow of the determination process, and FIG. 10B is a diagram illustrating a detailed example of the determination process. Hereinafter, the details of the determination process will be described along the flowchart of FIG. 10A with reference to FIG. 10B.

In step S1001, the determination unit 450 compares the trajectory of the position of the head portion of the subject 160 in the vertical direction in the predetermined time range T, which is notified from the trajectory calculating unit 420, with the determination information (the upper limit value and the lower limit value in the vertical direction) notified from the nodding trajectory acquiring unit 440.

In detail, the determination unit 450 calculates a difference value $z_1$ between the coordinate (the coordinate z) in the vertical direction at the start time ($=T_1$) and the minimum value among the trajectory r(t) of the position of the head portion of the subject 160 in the vertical direction in the predetermined time range T, which is notified from the trajectory calculating unit 420. Thus, the determination unit 450 determines whether or not the calculated difference value $z_1$ satisfies the determination condition (the difference value $z_1$ is equal to or more than the lower limit value $z_l$ in the vertical direction and is less than the upper limit value $z_u$ in the vertical direction, the lower limit value $z_l$ and the upper limit value $z_u$ being notified from the nodding trajectory acquiring unit 440).

In step S1001, when it is determined that the difference value $z_1$ is less than the upper limit value $z_l$ in the vertical direction or is equal to or more than the upper limit value $z_u$ in the vertical direction (No in step S1001), the process proceeds to step S608 of FIG. 6. Meanwhile, when it is determined that the difference value $z_1$ is equal to or more than the lower limit value $z_l$ in the vertical direction and is less than the upper limit value $z_u$ in the vertical direction (Yes in step S1001), the process proceeds to step S1002.

In step S1002, the determination unit 450 compares the trajectory of the position of the head portion of the subject 160 in the vertical direction in the predetermined time range T, which is notified from the trajectory calculating unit 420, with the determination information (the upper limit value and the lower limit value in the vertical direction) notified from the nodding trajectory acquiring unit 440.

In detail, the determination unit 450 calculates a difference value $z_2$ between the coordinate (the coordinate z) in the vertical direction at the termination time ($=T_2$) and the minimum value among the trajectory r(t) of the position of the head portion of the subject 160 in the vertical direction in the predetermined time range T, which is notified from the trajectory calculating unit 420. Thus, the determination unit 450 determines whether or not the calculated difference value $z_2$ satisfies the determination condition (the difference value $z_2$ is equal to or more than the lower limit value $z_l$ in the vertical direction and is less than the upper limit value $z_u$ in the vertical direction, the lower limit value $z_l$ and the upper limit value $z_u$ being notified from the nodding trajectory acquiring unit 440).

In step S1002, when it is determined that the difference value $z_2$ is less than the upper limit value $z_l$ in the vertical direction or is equal to or more than the upper limit value $z_u$ in the vertical direction (No in step S1002), the process proceeds to step S608 of FIG. 6. Meanwhile, when it is determined that the difference value $z_2$ is equal to or more than the lower limit value $z_l$ in the vertical direction and is less than the upper limit value $z_u$ in the vertical direction (Yes in step S1002), the process proceeds to step S1003.

In step S1003, the determination unit 450 compares the trajectory of the position of the head portion of the subject 160 in the transverse direction in the predetermined time range T, which is notified from the trajectory calculating unit 420, with the determination information (the upper limit value and the lower limit value in the transverse direction) notified from the nodding trajectory acquiring unit 440.

In detail, the determination unit 450 calculates a difference value $y_1$ between the coordinate (the coordinate y) in the transverse direction at the start time ($=T_1$) and the minimum value among the trajectory s(t) of the position of the head portion of the subject 160 in the transverse direction in the predetermined time range T, which is notified from the trajectory calculating unit 420. Thus, the determination unit 450 determines whether or not the calculated difference value $y_1$ satisfies the determination condition (the difference value $y_1$ is equal to or more than the lower limit value $y_l$ in the transverse direction and is less than the upper limit value $y_u$ in the transverse direction, the lower limit value $y_l$ and the upper limit value $y_u$ being notified from the nodding trajectory acquiring unit 440).

In step S1003, when it is determined that the difference value $y_1$ is less than the upper limit value $y_l$ in the transverse direction or is equal to or more than the upper limit value $y_u$ in the transverse direction (No in step S1003), the process proceeds to step S608 of FIG. 6. Meanwhile, when it is determined that the difference value $y_1$ is equal to or more than the lower limit value $y_l$ in the transverse direction and is less than the upper limit value $y_u$ in the transverse direction (Yes in step S1003), the process proceeds to step S1004.

In step S1004, the determination unit 450 compares the trajectory of the position of the head portion of the subject 160 in the transverse direction in the predetermined time range T, which is notified from the trajectory calculating unit 420, with the determination information (the upper limit value and the lower limit value in the transverse direction) notified from the nodding trajectory acquiring unit 440.

In detail, the determination unit 450 calculates a difference value $y_2$ between the coordinate (the coordinate y) in the transverse direction at the termination time ($=T_2$) and the minimum value among the trajectory s(t) of the position of the head portion of the subject 160 in the transverse direction in the predetermined time range T, which is notified from the trajectory calculating unit 420. Thus, the determination unit 450 determines whether or not the calculated difference value $y_2$ satisfies the determination condition (the difference value $y_2$ is equal to or more than the lower limit value $y_l$ in the transverse direction and is less than the upper limit value $y_u$ in the transverse direction, the lower limit value $z_l$ and the upper limit value $y_u$ being notified from the nodding trajectory acquiring unit 440).

In step S1004, when it is determined that the difference value $y_2$ is less than the upper limit value $y_l$ in the transverse direction or is equal to or more than the upper limit value $y_u$ in the transverse direction (No in step S1004), the process proceeds to step S608 of FIG. 6. Meanwhile, when it is determined that the difference value $y_2$ is equal to or more than the lower limit value $y_l$ in the transverse direction and is less than the upper limit value $y_u$ in the transverse direction (Yes in step S1004), the process proceeds to step S1005.

In step S1005, the determination unit 450 determines whether or not there was the nodding motion in the subject 160, and outputs a result of the determination indicating that there was the nodding motion in the subject 160. That is, when both the amount of a change in the position of the head portion of the subject 160 in the vertical direction and the amount of a change in the position of the head portion of the subject 160 in the transverse direction satisfy the determination condition, the determination unit 450 determines whether or not there was the nodding motion in the subject 160, and outputs a result of the determination indicating that there was the nodding motion in the subject 160.

As can be identified from the above description, in determining whether or not there is the nodding motion in the subject 160, the motion determining apparatus 120 according to the first embodiment uses the trajectories of the position of the head portion of the subject 160 in the vertical direction and the transverse direction. Further, in determining whether or not there is the nodding motion in the subject 160, the motion determining apparatus 120 according to the first embodiment switches the determination information according to the specified direction.

Accordingly, according to the motion determining apparatus 120 according to the first embodiment, as compared to a method of determining whether or not there is the nodding motion based on the amount of the vertical movement of the head portion of the subject, determination accuracy of the nodding motion can be improved.

Second Embodiment

According to the first embodiment, the trajectory information storing unit 150 stores the determination information (the upper limit value and lower limit value in the vertical direction and the transverse direction) in advance as the trajectory information 400. Further, according to the first embodiment, it has been described that the nodding trajectory acquiring unit 440 reads the determination information (the upper limit value and the lower limit value in the vertical direction and the transverse direction) from the trajectory information 400 of the trajectory information storing unit 150.

Accordingly, according to the second embodiment, whenever the subject changes, the nodding trajectory acquiring unit 440 calculates determination information suitable for each subject instead of storing the determination information (the upper limit value and the lower limit value in the vertical direction and the transverse direction) in the trajectory information 400 of the trajectory information storing unit 150. Accordingly, the motion determining unit 130 can further improve the determination accuracy of the nodding motion. Hereinafter, a difference between the first embodiment and the second embodiment will be mainly described.

[Flow of Motion Determining Process by Motion Determining Apparatus]

Figure 11:
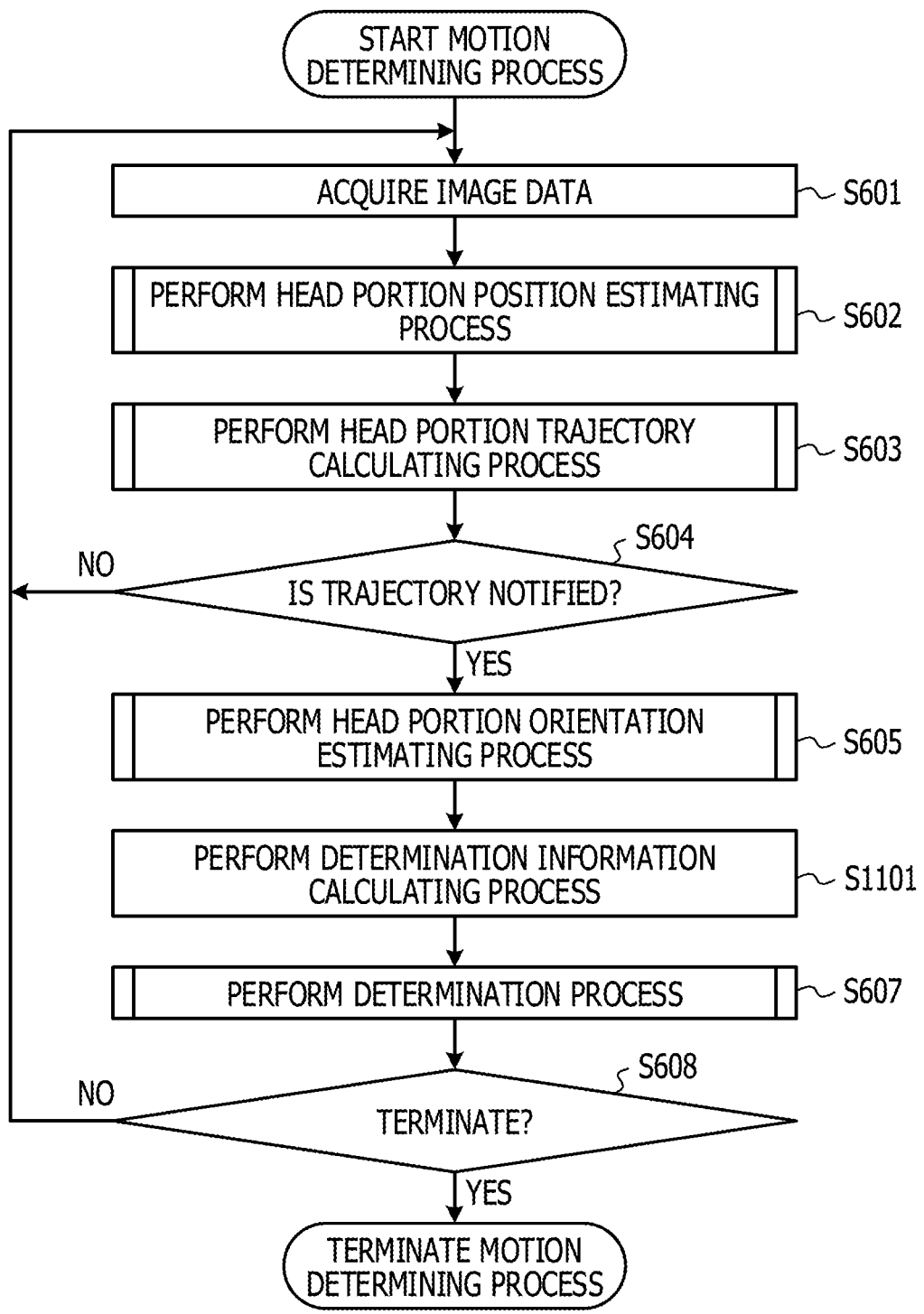
FIG. 11 is a flowchart illustrating flow of the motion determining process by the motion determining apparatus according to a second embodiment.

First, flow of the motion determining process by the motion determining apparatus 120 according to the second embodiment will be described. FIG. 11 is a flowchart illustrating flow of a motion determining process by the motion determining apparatus according to a second embodiment. A difference between the flowchart described using FIG. 6 according to the first embodiment and the flowchart described using FIG. 11 corresponds to step S1101.

In step S1101, the nodding trajectory acquiring unit 440 calculates the upper limit values and the lower limit values of the orientation of the head portion of the subject 160 in the vertical direction and the transverse direction, and executes a "determination information calculating process" of notifying the determination unit 450 of the calculated values as the determination information.

Figure 12:
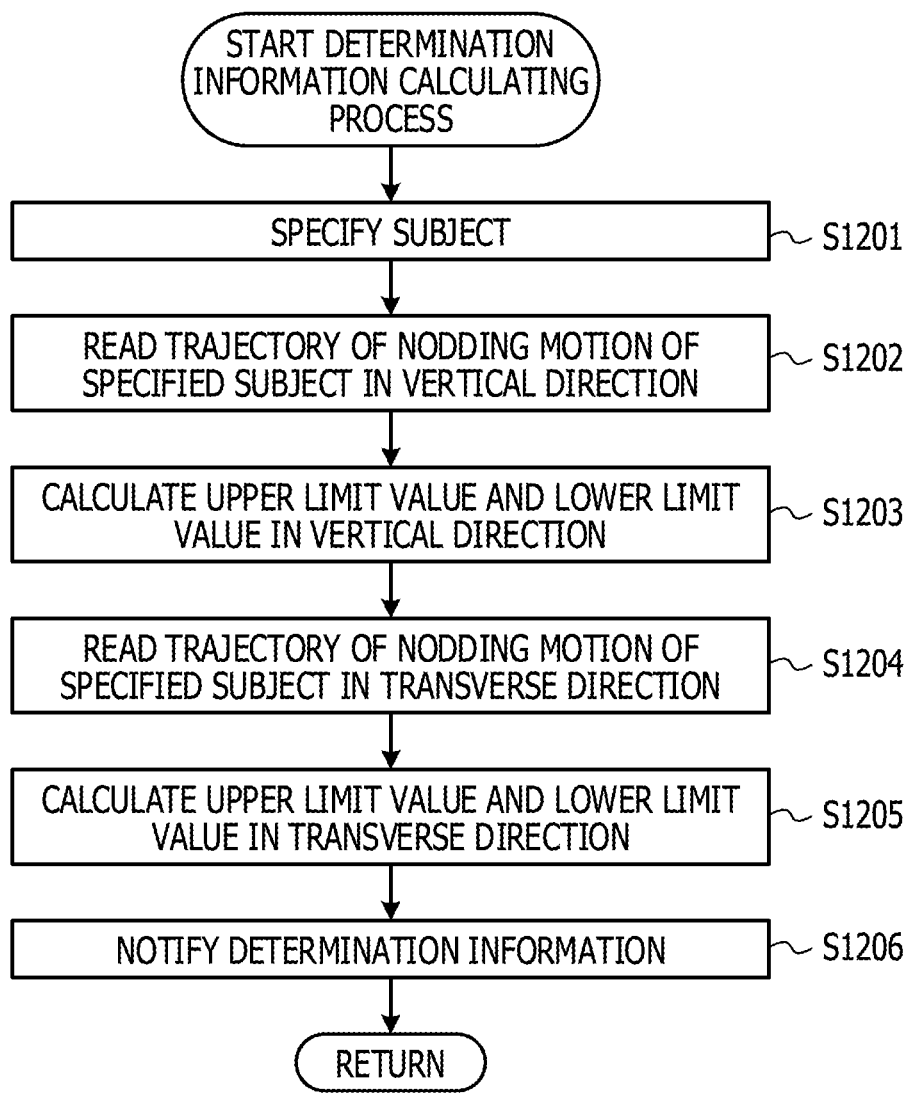
FIG. 12 is a first flowchart illustrating flow of a determination information calculating process.

FIG. 12 is a first flowchart illustrating flow of a determination information calculating process. In step S1201, the nodding trajectory acquiring unit 440 specifies the subject 160. A method of specifying the subject 160 is predetermined. For example, the nodding trajectory acquiring unit 440 may specify the subject 160 according to an instruction from an administrator of the motion determining apparatus 120. Otherwise, the nodding trajectory acquiring unit 440 may specify the subject 160 based on the image data transmitted from the imaging device 110.

In step S1202, the nodding trajectory acquiring unit 440 reads a trajectory of the nodding motion of the subject 160 itself in the vertical direction, which is a trajectory of the nodding motion according to the orientation of the head portion, with reference to the trajectory information 400 of the trajectory information storing unit 150.

In step S1203, the nodding trajectory acquiring unit 440 calculates the upper limit value and the lower limit value of the minimum value from the read trajectory of the nodding motion of the subject 160 itself in the vertical direction.

In step S1204, the nodding trajectory acquiring unit 440 reads a trajectory of the nodding motion of the subject 160 itself in the transverse direction, which is a trajectory of the nodding motion according to the orientation of the head portion, with reference to the trajectory information 400 of the trajectory information storing unit 150.

In step S1205, the nodding trajectory acquiring unit 440 calculates the upper limit value and the lower limit value of the minimum value from the read trajectory of the nodding motion of the subject 160 itself in the transverse direction.

In step S1206, the nodding trajectory acquiring unit 440 notifies the determination unit 450 of the read upper limit values and the read lower limit values in the vertical direction and the transverse direction as the determination information.

As can be identified from the above description, the motion determining apparatus 120 according to the second embodiment specifies the subject, and calculates the determination information based on the "trajectory of the nodding motion" of the specified subject.

Accordingly, according to the motion determining apparatus according to the second embodiment, the determination information suitable for the subject can be calculated, so that the determination accuracy of the nodding motion can be further improved.

Third Embodiment

Further, according to the first embodiment and the second embodiment, it has been described that the nodding trajectory acquiring unit 440 notifies the determination unit 450 of the upper limit value and the lower limit value in the vertical direction and the upper limit value and the lower limit value in the transverse direction as the determination information.

Accordingly, the determination information notified from the nodding trajectory acquiring unit 440 is not limited thereto. For example, the trajectories of the nodding motion in the vertical direction and the transverse direction may be notified as the determination information. Hereinafter, a difference between the third embodiment and the first and second embodiments will be mainly described.

[Details of Determination Process]

Figure 13A:
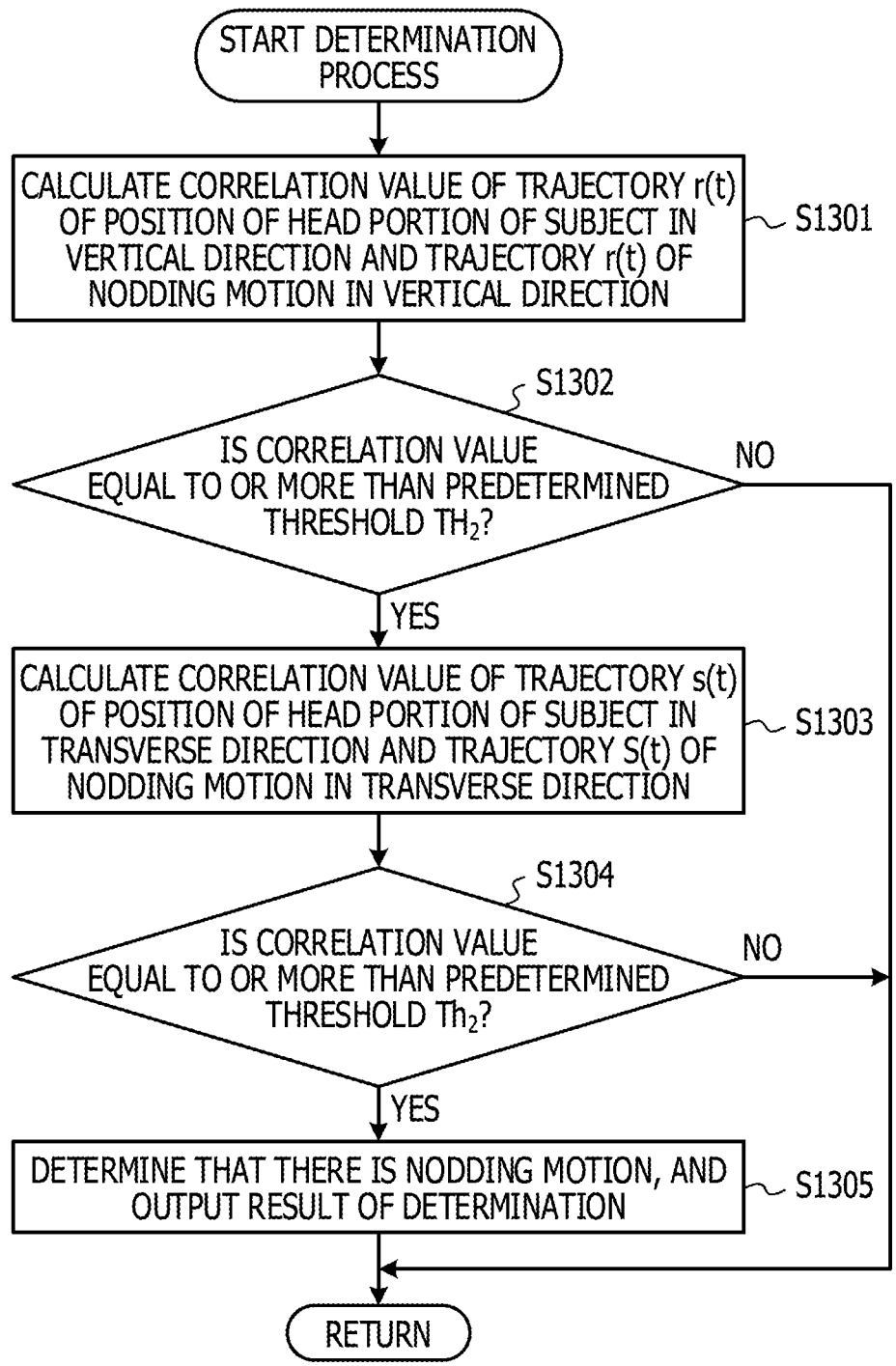

FIGS. 13A and 13B are diagrams illustrating details of the determination process. Among them, FIG. 13A is a flowchart illustrating flow of the determination process, and FIG. 13B is a diagram illustrating a detailed example of the determination process. Hereinafter, the details of the determination process will be described along the flowchart of FIG. 13A with reference to FIG. 13B.

In executing the determination process illustrated in FIG. 13A, the trajectory R(t) of the nodding motion of the subject 160 itself in the vertical direction and the trajectory S(t) of the nodding motion of the subject 160 itself in the transverse direction according to the orientation of the head portion of the subject 160 are notified from the nodding trajectory acquiring unit 440. However, the trajectory R(t) in the vertical direction and the trajectory S(t) in the transverse direction, notified from the nodding trajectory acquiring unit 440, may not be based on the nodding motion of the subject 160 itself or may be a trajectory calculated based on a plurality of trajectories.

In step S1301, the determination unit 450 compares the trajectory r(t) of the position of the head portion of the subject 160 in the vertical direction in the predetermined time range, which is notified from the trajectory calculating unit 420, with the trajectory R(t) of the nodding motion in the vertical direction, notified from the nodding trajectory acquiring unit 440. The determination unit 450, for example, calculates the correlation value in the vertical direction based on Equation (2).

$$\text{Correlation value} = \frac{1}{\sum_{t=0 \sim (T_2 - T_1)} |r(T_1 + t) - R(t)|} \quad (2)$$

In step S1302, the determination unit 450 determines whether or not the correlation value calculated in step S1301 satisfies the determination condition (whether or not the correlation value is equal to or more than a predetermined threshold value $Th_2$). In step S1302, when it is determined that the correlation value is less than a predetermined threshold value $Th_2$ (No in step S1302), the process proceeds to step S608 in FIG. 6.

Meanwhile, in step S1302, when it is determined that the correlation value is equal to or more than a predetermined threshold value $Th_2$ (Yes in step S1302), the process proceeds to S1303.

In step S1303, the determination unit 450 compares the trajectory s(t) of the position of the head portion of the subject 160 in the transverse direction in the predetermined time range, which is notified from the trajectory calculating unit 420, with the trajectory S(t) of the nodding motion in the transverse direction, notified from the nodding trajectory acquiring unit 440. Similar to the vertical direction, the determination unit 450 calculates the correlation value in the transverse direction based on Equation (3).

$$\text{Correlation value} = \frac{1}{\sum_{t=0 \sim (T_2 - T_1)} |s(T_1 + t) - S(t)|} \quad (3)$$

In step S1304, the determination unit 450 determines whether or not the correlation value calculated in step S1303 satisfies the determination condition (whether or not the correlation value is equal to or more than a predetermined threshold value $Th_2$). In step S1304, when it is determined that the correlation value is less than a predetermined threshold value $Th_2$ (No in step S1304), the process proceeds to step S608 in FIG. 6.

Meanwhile, in step S1304, when it is determined that the correlation value is equal to or more than a predetermined threshold value $Th_2$ (Yes in step S1304), the process proceeds to S1305.

In step S1305, the determination unit 450 determines whether or not there was the nodding motion in the subject 160, and outputs a result of the determination indicating that there was the nodding motion in the subject 160. That is, when both the trajectory of the position of the head portion of the subject 160 in the vertical direction and the trajectory of the position of the head portion of the subject 160 in the transverse direction satisfy the determination condition, the determination unit 450 determines whether or not there was the nodding motion in the subject 160, and outputs a result of the determination indicating that there was the nodding motion in the subject 160.

As can be identified from the above description, in determining whether or not there is the nodding motion in the subject, the motion determining apparatus 120 according to the third embodiment calculates a correlation value of the trajectories of the nodding motion in the vertical direction and the transverse direction.

Accordingly, according to the motion determining apparatus 120 according to a third embodiment, the same effect as the second embodiment can be achieved.

In the above description, when the correlation value calculated in step S1301 is equal to or more than the predetermined threshold value $Th_2$ and the correlation value calculated in step S1303 is equal to or more than the predetermined threshold value $Th_2$, it is determined that there is the nodding motion in the subject 160. However, the determination method based on the correlation value is not limited thereto. For example, when the sum of the correlation value calculated in step S1301 and the correlation value calculated in step S1303 is equal to or more than a predetermined threshold value, it may be determined that there is the nodding motion in the subject 160.

Fourth Embodiment

In the first to third embodiments, it has been described that the trajectory information storing unit 150 stores the trajectory of the nodding motion in the vertical direction and the trajectory of the nodding motion in the transverse direction as the trajectory information 400 for each orientation of the head portion of the subject in advance.

On the other hand, in the fourth embodiment, it has been described that the trajectory information storing unit 150 stores a 3-dimensional trajectory of the nodding motion instead of storing the trajectory of the nodding motion in the vertical direction and the trajectory of the nodding motion in the transverse direction as the trajectory information 400. Further, in the fourth embodiment, when receiving a notification about the orientation of the head portion of the subject from the head portion orientation estimating unit 430, the nodding trajectory acquiring unit 440 converts the 3-dimensional trajectory of the nodding motion based on the notified direction, and calculates the determination information for the notified direction. Hereinafter, a difference between the fourth embodiment and the first to the third embodiments will be mainly described.

[Details of Determination Information Calculating Process]

Figure 14:
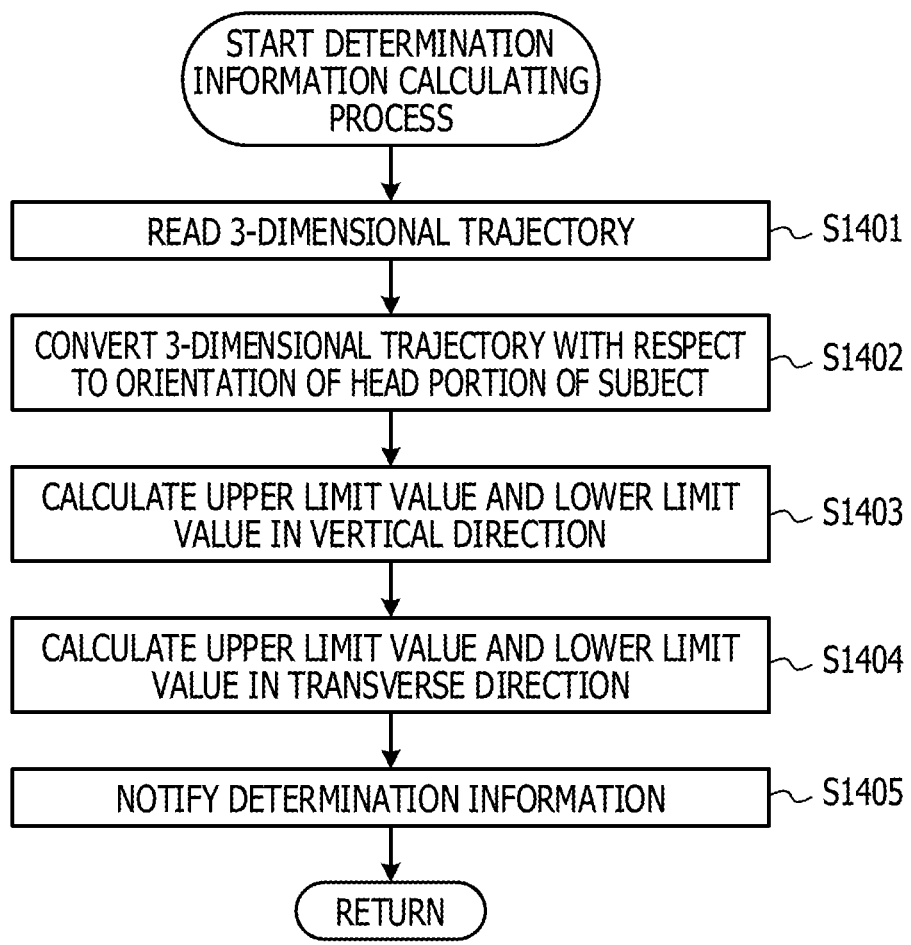
FIG. 14 is a second flowchart illustrating flow of the determination information calculating process.

FIG. 14 is a second flowchart illustrating flow of a determination information calculating process. In step S1401, the nodding trajectory acquiring unit 440 reads the 3-dimensional trajectory of the nodding motion with reference to the trajectory information 400 of the trajectory information storing unit 150.

In step S1402, the nodding trajectory acquiring unit 440 converts the read 3-dimensional trajectory of the nodding motion with respect to the orientation of the head portion of the subject 160.

Here, the orientation of the head portion of the subject 160, notified from the head portion orientation estimating unit 430, is expressed by Equation (4).

$$\text{Orientation of head portion of subject} = (\theta_{x1}, \theta_{y1}, \theta_{z1}) \quad (4)$$

Meanwhile, it is assumed that the 3-dimensional trajectory of the nodding motion, read from the nodding trajectory acquiring unit 440, has the orientation of the head portion expressed by Equation (5).

$$\text{orientation of head portion of three-dimensional trajectory of nodding motion stored in trajectory information} = (\theta_{x0}, \theta_{y0}, \theta_{z0}) \quad (5)$$

In this case, a difference $e_x$, $O_w$ and $e_z$ between the orientation of the head portion of the subject 160 and the orientation of the head portion of the 3-dimensional trajectory of the nodding motion stored in the trajectory information 400 is expressed by Equation (6).

$$\text{difference}(\theta_x, \theta_y, \theta_z) = (\theta_{x1} - \theta_{x0}, \theta_{y1} - \theta_{y0}, \theta_{z1} - \theta_{z0}) \quad (6)$$

In the case of a relationship expressed by Equation (6), the 3-dimensional trajectory of the nodding motion, read from the nodding trajectory acquiring unit 440, can convert the 3-dimensional trajectory for the orientation of the head portion of the subject 160 by using Equation (7).

$$Rot(\theta x, \theta y, \theta z) = \begin{pmatrix} \cos(\theta y)\cos(\theta z) & \sin(\theta x)\sin(\theta y)\cos(\theta z) - \cos(\theta x)\sin(\theta z) & \cos(\theta x)\sin(\theta y)\cos(\theta z) + \sin(\theta x)\sin(\theta z) \\ \cos(\theta x)\sin(\theta z) & \sin(\theta x)\sin(\theta y)\sin(\theta z) + \cos(\theta x)\cos(\theta z) & \cos(\theta x)\sin(\theta y)\sin(\theta z) + \sin(\theta x)\cos(\theta z) \\ -\sin(\theta y) & -\sin(\theta x)\cos(\theta y) & \cos(\theta x)\cos(\theta y) \end{pmatrix} \quad (7)$$

Here, the nodding trajectory acquiring unit 440 converts the read 3-dimensional trajectory of the nodding motion into the 3-dimensional trajectory for the orientation of the head portion of the subject 160 by Equation (7), and the process proceeds to step S1403.

In step S1403, the nodding trajectory acquiring unit 440 calculates the upper limit value and the lower limit value in the vertical direction based on the trajectory in the vertical direction among the three-dimensional trajectory converted in the step S1402.

In step S1404, the nodding trajectory acquiring unit 440 calculates the upper limit value and the lower limit value in the transverse direction based on the trajectory in the transverse direction among the three-dimensional trajectory converted in the step S1402.

In step S1405, the nodding trajectory acquiring unit 440 notifies the determination unit 450 of the upper limit values and the lower limit values in the vertical direction and the transverse direction as the determination information.

As can be identified from the above description, in the motion determining apparatus 120 according to the fourth embodiment, the trajectory information storing unit 150 stores the 3-dimensional trajectory of the nodding motion as the trajectory information 400. Further, in the motion determining apparatus 120 according to the fourth embodiment, when receiving a notification about the orientation of the head portion of the subject from the head portion orientation estimating unit 430, the nodding trajectory acquiring unit 440 converts the 3-dimensional trajectory of the nodding motion based on the notified direction. Accordingly, the nodding trajectory acquiring unit 440 calculates the determination information (the upper limit value and the lower limit value in the vertical direction and the upper limit value and the lower limit value in the transverse direction) with respect to the notified direction, and notifies the determination unit 450 of the calculated determination information.

As a result, the motion determining apparatus 120 according to the fourth embodiment can simplify the trajectory information stored in the trajectory information storing unit 150 (it is unnecessary to store the trajectory of the nodding motion for each orientation of the head portion in the vertical direction and the trajectory of the nodding motion for each orientation of the head portion in the transverse direction).

In the above description, after converting the 3-dimensional trajectory of the nodding motion with respect to the orientation of the head portion of the subject 160, the upper limit value and the lower limit value are calculated, and the calculated values are notified to the determination unit 450. However, instead of calculating the upper limit value and the lower limit value, the trajectory in the vertical direction and the trajectory in the transverse direction among the 3-dimensional trajectory converted with respect to the orientation of the head portion of the subject 160 as the determination information may be notified to the determination unit 450.

Fifth Embodiment

In the fifth embodiment, an application example of the nodding trajectory determining system including the motion determining apparatus 120 described in the first to fourth embodiments will be described.

(1) Application Example 1

Figure 15:
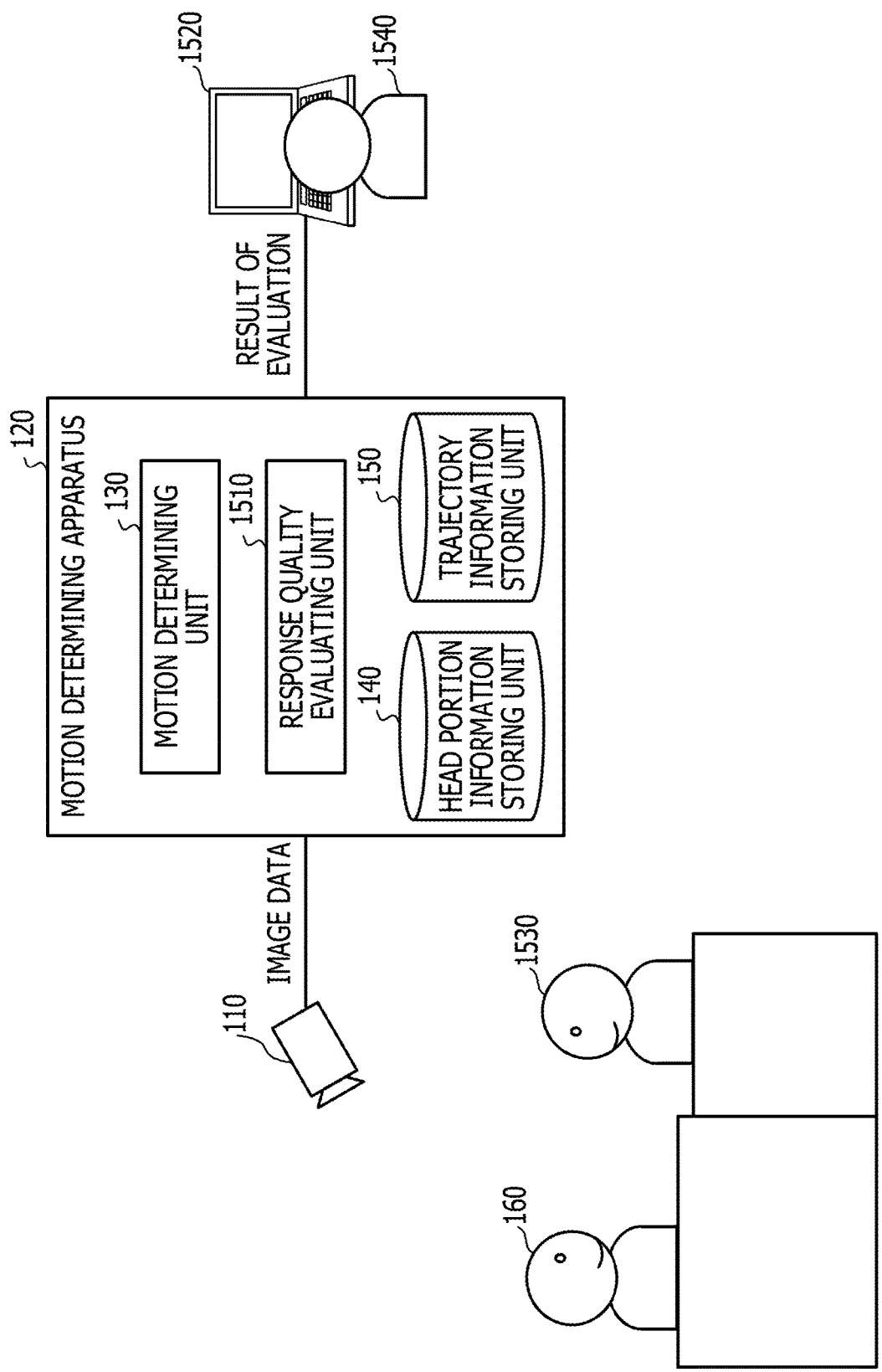
FIG. 15 is a diagram illustrating a first application example of the nodding motion determining system.

FIG. 15 is a diagram illustrating a first application example of the nodding motion determining system. In detail, FIG. 15 illustrates a case where the nodding motion determining system is installed in a store and is applied to a scene in which response quality of a clerk is evaluated. In the application example of FIG. 15, the subject 160 is set as the clerk in the store. Further, a motion determining apparatus 1500 functions as a response quality evaluating unit 1510 in addition to the motion determining unit 130.

As illustrated in FIG. 15, as the imaging device 110 captures an element when the clerk (the subject 160) responses a customer 1530, the motion determining unit 130 outputs a result of the determination indicating that there was the nodding motion in the clerk (the subject 160).

The response quality evaluating unit 1510 evaluates the response quality of the clerk (the subject 160) based on the result of the determination output from the motion determining unit 130. The response quality evaluating unit 1510, for example, calculates an evaluation value of the response quality based on Equation (8). $Th_3$ denotes an ideal nodding frequency.

$$\text{Evaluation value of response quality} = 1 - \left| \frac{\text{Number of times by which it is determined that there is nodding motion}}{\text{Total number of frames}} - Th_3 \right| \quad (8)$$

The evaluation value of the response quality calculated by the response quality evaluating unit 1510 is transmitted to a terminal 1520 of an administrator 1540 that manages the clerk (the subject 160) and is managed by the administrator 1540.

In this way, the administrator 1540 can manage whether or not the clerk (the subject 160) is performing the nodding motion at a frequency close to the ideal nodding frequency.

(2) Application Example 2

Figure 16:
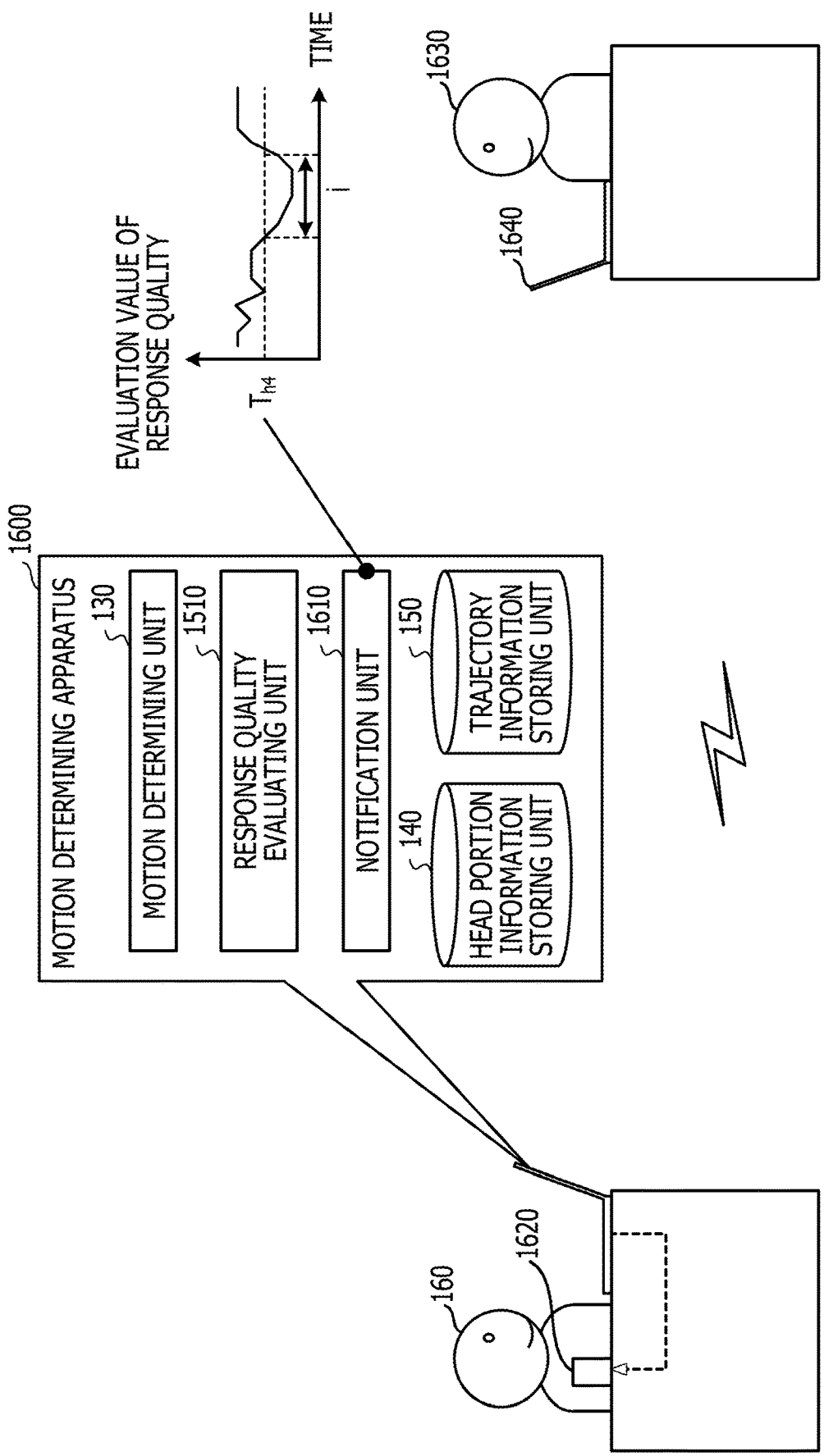
FIG. 16 is a diagram illustrating a second application example of the nodding motion determining system.

FIG. 16 is a diagram illustrating a second application example of the nodding motion determining system. In detail, FIG. 16 illustrates a case where the nodding motion determining system is installed in a support center that supports a client 1630 by a videophone and is applied to a scene to evaluate the response quality of an operator. In the application example of FIG. 16, the subject 160 is a call center operator. Further, a motion determining apparatus 1600 functions as a response quality evaluating unit 1510 and a notification unit 1610 in addition to the motion determining unit 130.

As illustrated in FIG. 16, in a state in which a terminal 1640 of the client 1630 is connected to a terminal functioning as the motion determining apparatus 1600, an element when the operator (the subject 160) corresponds to the client 1630 is captured by an imaging device built in the terminal functioning as the motion determining apparatus 1600. Accordingly, the motion determining unit 130 outputs the result of the determination indicating that there was the nodding motion in the operator (the subject 160).

The response quality evaluating unit 1510 evaluates the response quality of the operator (the subject 160) based on the result of the determination output from the motion determining unit 130. The evaluation value of the response quality calculated by the response quality evaluating unit 1510 is notified to the notification unit 1610.

The notification unit 1610 manages a change in the evaluation value of the response quality according to a time, and when a state in which the evaluation value of the response quality is less than a predetermined threshold value $Th_4$ continues for i or more seconds, vibrates a mobile terminal 1620 held by the operator (the subject 160). Accordingly, the operator (the subject 160) can improve the response quality.

(3) Application Example 3

Figure 17:
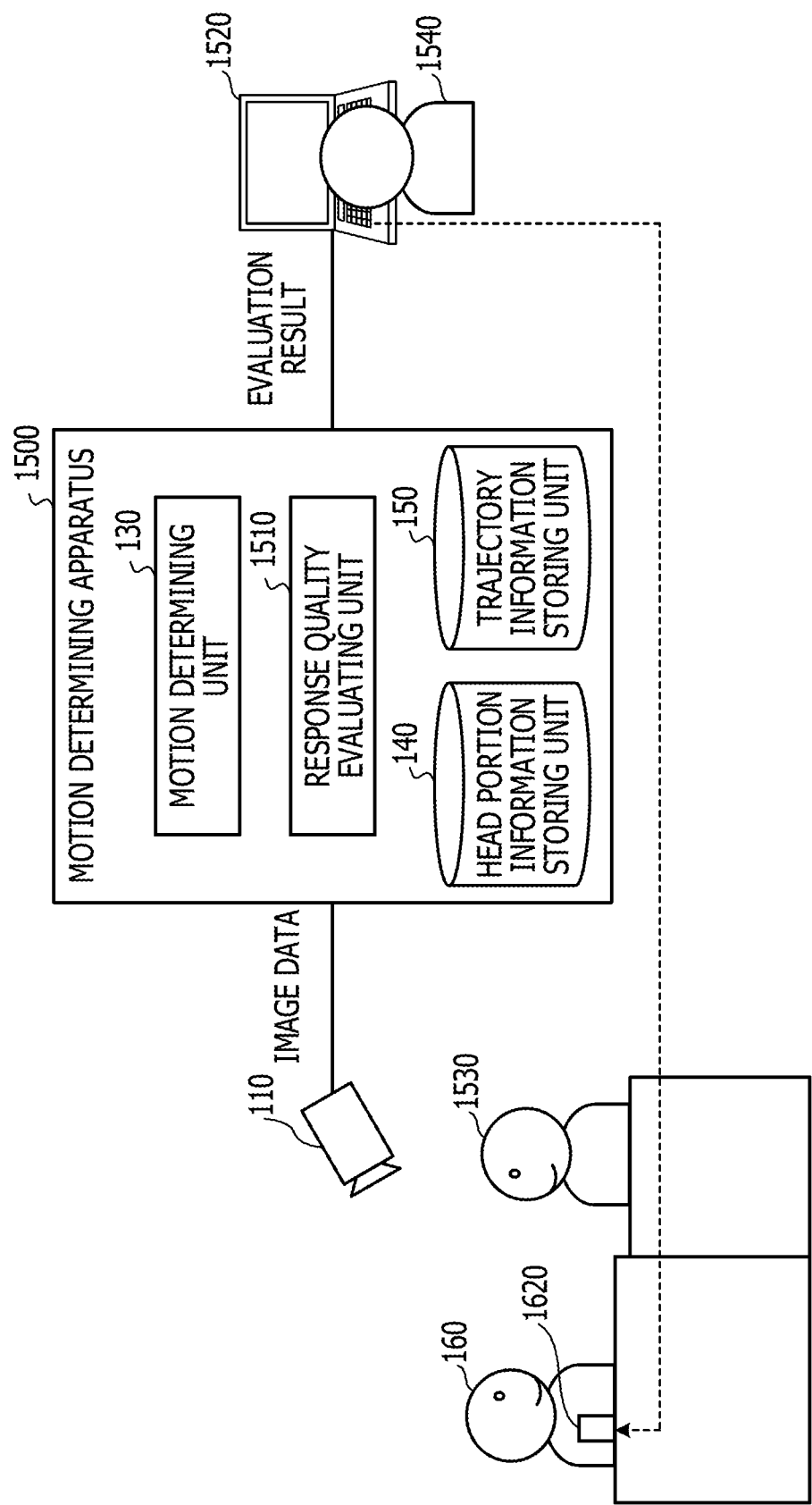
FIG. 17 is a diagram illustrating a third application example of the nodding motion determining system.

FIG. 17 is a diagram illustrating a third application example of the nodding motion determining system. In detail, FIG. 17 illustrates a case where the nodding motion determining system is installed in a store and is applied to a scene in which response quality of a clerk is evaluated. A difference between the first application example described using FIG. 15 and the third application example of FIG. 17 is that the administrator 1540 searches for a result of the evaluation, and notifies the mobile terminal 1620 held by the clerk (the subject 160) of a notification urging improvement of the response quality through a terminal 1710 of the administrator 1540 if desired. Accordingly, the clerk (the subject 160) can improve the response quality based on an instruction of the administrator 1540.

Another Embodiment

In the above embodiments, although a case where a central position of the detected area 711 of the head portion is specified and coordinates of the central position is notified as a position of the head portion of the subject 160 has been described, the position of the head portion of the subject 160 is not limited to the coordinates of the central position of the detected area 711 of the head portion. For example, coordinates of a specific portion (eyes, a nose, and the like) of a head may be notified as the position (the coordinate y and the coordinate z) of the head portion of the subject 160.

Further, in the above embodiments, a case has been described in which whether or not there is the nodding motion of one subject 160 is determined based on the image data captured by one imaging device 110. However, whether or not there are nodding motions of a plurality of subjects is determined based on the image data captured by one imaging device 110.

The present disclosure is not limited to configurations described in the above embodiments, such as a combination of elements. Regarding this point, the scope of the present disclosure is not changed without departing from the spirit of the present embodiment, and can be appropriately determined according to an application form.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An apparatus for motion determination, the apparatus comprising:
   a memory; and
   a processor coupled to the memory, the processor being configured to
   execute a specifying process that includes detecting an orientation of a head portion of a subject, execute a calculation process that includes calculating a trajectory of a position of the head portion of the subject in a vertical direction and a trajectory of the position of the head portion of the subject in a transverse direction in a predetermined time range, and execute a determination process that includes:
- selecting a corresponding determination condition from among a plurality of determination conditions by using the detected orientation of the head portion, each of the plurality of determination conditions being associated with a respective dedicated angle range of the head portion, the corresponding determination condition being selected by comparing the detected orientation of the head portion with the respective dedicated angle range associated with each of the plurality of determination conditions;
- obtaining a determination result by determining whether the calculated trajectory in the vertical direction and the calculated trajectory in the transverse direction satisfy the selected corresponding determination condition; and
- in response to the determination result indicating that the calculated trajectory in the vertical direction and the calculated trajectory in the transverse direction satisfy a determination condition for the specified orientation of the head portion, determining that there is a predetermined motion mapped to a motion of the head portion of the subject in the vertical direction.

2. The apparatus according to claim 1,
wherein the determination process is configured to
compare the calculated trajectory in the vertical direction with an upper limit value and a lower limit value for the specified orientation of the head portion in the vertical direction,
compare the calculated trajectory in the transverse direction with an upper limit value and a lower limit value for the specified orientation of the head portion in the transverse direction, and
determine whether or not the determination condition is satisfied.

3. The apparatus according to claim 2,
wherein the specifying process is further configured to specify the subject, and
wherein the determination process is configured to
compare the calculated trajectory in the vertical direction with the upper limit value and the lower limit value of the subject for the specified orientation of the head portion in the vertical direction, and
compare the calculated trajectory in the transverse direction with the upper limit value and the upper limit value of the subject for the specified orientation of the head portion in the transverse direction.

4. The apparatus according to claim 1,
wherein the determination process is configured to
compare the calculated trajectory in the vertical direction with a predetermined trajectory for the specified orientation of the head portion in the vertical direction,
compare the calculated trajectory in the transverse direction with a predetermined trajectory for the specified orientation of the head portion in the transverse direction, and
determine whether or not the determination condition is satisfied.

5. The apparatus according to claim 4,
wherein the specifying process is further configured to specify the subject, and
wherein the determination process is configured to
compare the calculated trajectory in the vertical direction with a predetermined trajectory of the subject for the specified orientation of the head portion in the vertical direction, and
compare the calculated trajectory in the transverse direction with a predetermined trajectory of the subject for the specified orientation of the head portion in the transverse direction.

6. A method for motion determination, the method comprising:
executing a specifying process that includes detecting an orientation of a head portion of a subject,
executing a calculation process that includes calculating a trajectory of a position of the head portion of the subject in a vertical direction and a trajectory of the position of the head portion of the subject in a transverse direction in a predetermined time range, and
executing a determination process that includes:
- selecting a corresponding determination condition from among a plurality of determination conditions by using the detected orientation of the head portion, each of the plurality of determination conditions being associated with a respective dedicated angle range of the head portion, the corresponding determination condition being selected by comparing the detected orientation of the head portion with the respective dedicated angle range associated with each of the plurality of determination conditions;
- obtaining a determination result by determining whether the calculated trajectory in the vertical direction and the calculated trajectory in the transverse direction satisfy the selected corresponding determination condition; and
- in response to the determination result indicating that the calculated trajectory in the vertical direction and the calculated trajectory in the transverse direction satisfy a determination condition for the specified orientation of the head portion, determining that there is a predetermined motion mapped to a motion of the head portion of the subject in the vertical direction.

7. The method according to claim 6,
wherein the determination process is configured to
compare the calculated trajectory in the vertical direction with an upper limit value and a lower limit value for the specified orientation of the head portion in the vertical direction,
compare the calculated trajectory in the transverse direction with an upper limit value and a lower limit value for the specified orientation of the head portion in the transverse direction, and
determine whether or not the determination condition is satisfied.

8. The method according to claim 7,
wherein the specifying process is further configured to specify the subject, and
wherein the determination process is configured to
compare the calculated trajectory in the vertical direction with the upper limit value and the lower limit value of the subject for the specified orientation of the head portion in the vertical direction, and
compare the calculated trajectory in the transverse direction with the upper limit value and the upper limit value of the subject for the specified orientation of the head portion in the transverse direction.

9. The method according to claim 6,
wherein the determination process is configured to
compare the calculated trajectory in the vertical direction with a predetermined trajectory for the specified orientation of the head portion in the vertical direction,
compare the calculated trajectory in the transverse direction with a predetermined trajectory for the specified orientation of the head portion in the transverse direction, and
determine whether or not the determination condition is satisfied.

10. The method according to claim 9,
wherein the specifying process is further configured to specify the subject, and
wherein the determination process is configured to
compare the calculated trajectory in the vertical direction with a predetermined trajectory of the subject for the specified orientation of the head portion in the vertical direction, and
compare the calculated trajectory in the transverse direction with a predetermined trajectory of the subject for the specified orientation of the head portion in the transverse direction.

11. A non-transitory computer-readable storage medium for storing a program which causes a processor to perform processing for motion determination, the processing comprising:
executing a specifying process that includes detecting an orientation of a head portion of a subject,
executing a calculation process that includes calculating a trajectory of a position of the head portion of the subject in a vertical direction and a trajectory of the position of the head portion of the subject in a transverse direction in a predetermined time range, and
executing a determination process that includes:
selecting a corresponding determination condition from among a plurality of determination conditions by using the detected orientation of the head portion, each of the plurality of determination conditions being associated with a respective dedicated angle range of the head portion, the corresponding determination condition being selected by comparing the detected orientation of the head portion with the respective dedicated angle range associated with each of the plurality of determination conditions;
obtaining a determination result by determining whether the calculated trajectory in the vertical direction and the calculated trajectory in the transverse direction satisfy the selected corresponding determination condition; and
in response to the determination result indicating that the calculated trajectory in the vertical direction and the calculated trajectory in the transverse direction satisfy a determination condition for the specified orientation of the head portion, determining that there is a predetermined motion mapped to a motion of the head portion of the subject in the vertical direction.

12. The non-transitory computer-readable storage medium according to claim 11,
wherein the determination process is configured to
compare the calculated trajectory in the vertical direction with an upper limit value and a lower limit value for the specified orientation of the head portion in the vertical direction,
compare the calculated trajectory in the transverse direction with an upper limit value and a lower limit value for the specified orientation of the head portion in the transverse direction, and
determine whether or not the determination condition is satisfied.

13. The non-transitory computer-readable storage medium according to claim 12,
wherein the specifying process is further configured to specify the subject, and
wherein the determination process is configured to
compare the calculated trajectory in the vertical direction with the upper limit value and the lower limit value of the subject for the specified orientation of the head portion in the vertical direction, and
compare the calculated trajectory in the transverse direction with the upper limit value and the upper limit value of the subject for the specified orientation of the head portion in the transverse direction.

14. The non-transitory computer-readable storage medium according to claim 11,
wherein the determination process is configured to
compare the calculated trajectory in the vertical direction with a predetermined trajectory for the specified orientation of the head portion in the vertical direction,
compare the calculated trajectory in the transverse direction with a predetermined trajectory for the specified orientation of the head portion in the transverse direction, and
determine whether or not the determination condition is satisfied.

15. The non-transitory computer-readable storage medium according to claim 14,
wherein the specifying process is further configured to specify the subject, and
wherein the determination process is configured to
compare the calculated trajectory in the vertical direction with a predetermined trajectory of the subject for the specified orientation of the head portion in the vertical direction, and
compare the calculated trajectory in the transverse direction with a predetermined trajectory of the subject for the specified orientation of the head portion in the transverse direction.

* * * * *